US010853710B2

(12) United States Patent
Bozier

(10) Patent No.: US 10,853,710 B2
(45) Date of Patent: Dec. 1, 2020

(54) METHOD, SYSTEM AND APPARATUS FOR RENDERING A DOCUMENT

(71) Applicant: CANON KABUSHIKI KAISHA, Tokyo (JP)

(72) Inventor: Rolfe Craig Bozier, Hornsby Heights (AU)

(73) Assignee: Canon Kabushiki Kaisha, Tokyo (JP)

( * ) Notice: Subject to any disclaimer, the term of this patent is extended or adjusted under 35 U.S.C. 154(b) by 399 days.

(21) Appl. No.: 14/947,950

(22) Filed: Nov. 20, 2015

(65) Prior Publication Data

US 2016/0148082 A1 May 26, 2016

(30) Foreign Application Priority Data

Nov. 24, 2014 (AU) ................................. 2014265139

(51) Int. Cl.
| | | |
|---|---|---|
| *G06K 15/00* | (2006.01) | |
| *G06K 15/02* | (2006.01) | |
| *G06T 11/60* | (2006.01) | |
| *G06T 11/40* | (2006.01) | |

(52) U.S. Cl.
CPC .......... *G06K 15/1851* (2013.01); *G06T 11/40* (2013.01); *G06T 11/60* (2013.01); *G06K 15/1814* (2013.01)

(58) Field of Classification Search
CPC ........... G06K 15/1875; G06K 15/1857; G06K 15/1851; G06T 3/30; G06T 15/005; G06T 15/00; G06T 15/60
See application file for complete search history.

(56) References Cited

U.S. PATENT DOCUMENTS

| | | | | |
|---|---|---|---|---|
| 6,269,190 B1* | 7/2001 | Mikkelsen | .............. | G06T 11/60 382/232 |
| 6,961,060 B1* | 11/2005 | Mochizuki | .............. | A63F 13/12 345/473 |
| 7,804,499 B1* | 9/2010 | Molnar | ................. | G06T 15/005 345/422 |
| 2004/0051904 A1* | 3/2004 | Lapstun | ................. | G03G 15/55 358/2.1 |
| 2008/0291493 A1* | 11/2008 | Smith | ................... | G06F 3/1204 358/1.15 |

(Continued)

*Primary Examiner* — Cesar B Paula
*Assistant Examiner* — Carl E Barnes, Jr.
(74) *Attorney, Agent, or Firm* — Canon U.S.A., Inc. IP Division

(57) ABSTRACT

A method of rendering a document described in a page description language, is disclosed. The document comprising a plurality of images is received. An intermediate graphical representation of the document is formed based on image metadata for the images, the intermediate graphical representation being subdivided into a plurality of tiles. Image data of one of the images is received to render the intermediate graphical representation. A tile of the intermediate graphical representation touched by the received image is identified, in response to receiving the image data. The identified tile is marked for rendering based on a number of the received images for the identified tile compared to a determined number of images contributing to the identified tile, the number of images contributing to the tile being determined using image metadata of the images. The document is rendered using the marked tile.

17 Claims, 19 Drawing Sheets

(56) References Cited

U.S. PATENT DOCUMENTS

| | | | |
|---|---|---|---|
| 2009/0244622 A1 | 10/2009 | Maresch | |
| 2009/0296142 A1* | 12/2009 | Tomihisa | G06K 15/02 358/1.15 |
| 2010/0079809 A1 | 4/2010 | Bellert | |
| 2010/0281402 A1* | 11/2010 | Staikos | G06F 17/30899 715/760 |
| 2013/0107289 A1* | 5/2013 | Brodzinski | G06K 15/1857 358/1.9 |
| 2014/0071150 A1* | 3/2014 | Fishwick | G06T 15/005 345/589 |
| 2015/0036168 A1* | 2/2015 | Oguro | G06F 3/1294 358/1.14 |

* cited by examiner

Fig. 11

METHOD, SYSTEM AND APPARATUS FOR RENDERING A DOCUMENT

REFERENCE TO RELATED PATENT APPLICATION(S)

This application claims the benefit under 35 U.S.C. § 119 of the filing date of Australian Patent Application No. 2014265139, filed 24 Nov. 2014, hereby incorporated by reference in its entirety as if fully set forth herein.

TECHNICAL FIELD

The present invention relates generally to printing systems and, in particular, to a printing system that uses parallel processing to increase performance. The present invention also relates to a method, system and apparatus of rendering a document. The present invention also relates to a computer program product including a computer readable medium having recorded thereon a computer program for rendering a document.

BACKGROUND

Many printing systems accept a high-level description of the output in the form of a page description language (PDL) and convert the high-level description to a pixel-based representation, suitable for sending to a print engine. Examples of such printing systems include server-based raster image processors (RIPs) that send their output to a file or a printer. Other examples of such printing systems include standalone embedded printers and split systems where a portion of processing is performed in a driver or server, and the remaining processing is performed on a low-capability printer device.

A typical processing path for print data is for the print data to be converted from PDL format to a display list (DL) which contains drawing commands. The display list is then converted to one or more intermediate formats, before finally being rendered to pixels. An advantage of an intermediate format is that the intermediate format is significantly smaller than the pixel output, and yet still allows analysis and processing of page content.

A system that renders a page by converting the page objects to pixels will suffer poor performance due to the need to process large amounts of pixel data. The page rendering algorithm known as Painter's Algorithm is known to perform poorly in complicated pages due to the need to process large amounts of pixel data. Another area where printing systems can perform poorly is when the printing system must deal with large amounts of image data that are included in the PDL data. In order to create a final page representation, such input image data often needs significant processing. The processing can include decoding and decompression, rotation, scaling, shearing, colour space conversion and re-compression.

There is a constant requirement for improving the performance of printing systems. One method for improving performance of a printing system is to use a processor that provides multi-thread capabilities. In a multi-thread printing system, the job of processing and rendering a PDL of a document can be broken into separate tasks that can be performed in parallel. One problem with parallel printing systems is that some parts of the processing pipeline are difficult to make parallel, and these parts of the processing pipeline can take significant amounts of time. For example, some PDLs or PDL interpreters do not enable the task of processing the image data in a PDL to be broken down into multiple parallel subtasks. The task of processing the image data in a PDL represents a choke point in the processing of a print job. It is not possible to begin rendering until all the image data has been processed.

SUMMARY

It is an object of the present invention to substantially overcome, or at least ameliorate, one or more disadvantages of existing arrangements.

According to one aspect of the present disclosure there is provided a method of rendering a document described in a page description language, the method comprising:
  receiving the document comprising a plurality of images;
  forming an intermediate graphical representation of the document based on image metadata for the images, the intermediate graphical representation being subdivided into a plurality of tiles;
  receiving image data of one of said images to render the intermediate graphical representation;
  identifying a tile of the intermediate graphical representation touched by said received image, in response to receiving the image data;
  marking the identified tile for rendering based on a number of the received images for the identified tile compared to a determined number of images contributing to the identified tile, the number of images contributing to said tile being determined using image metadata of said images; and
  rendering the document using the marked tile.

According to another aspect of the present disclosure there is provided a system for rendering a document described in a page description language, the system comprising:
  a memory for storing data and a computer program;
  a processor coupled to the memory for executing said program, said program comprising instructions for:
    receiving the document comprising a plurality of images;
    forming an intermediate graphical representation of the document based on image metadata for the images, the intermediate graphical representation being subdivided into a plurality of tiles;
    receiving image data of one of said images to render the intermediate graphical representation;
    identifying a tile of the intermediate graphical representation touched by said received image, in response to receiving the image data;
    marking the identified tile for rendering based on a number of the received images for the identified tile compared to a determined number of images contributing to the identified tile, the number of images contributing to said tile being determined using image metadata of said images; and
    rendering the document using the marked tile.

According to still another aspect of the present disclosure there is provided an apparatus for rendering a document described in a page description language, the method comprising:
  means for receiving the document comprising a plurality of images;
  means for forming an intermediate graphical representation of the document based on image metadata for the images, the intermediate graphical representation being subdivided into a plurality of tiles;
  means for receiving image data of one of said images to render the intermediate graphical representation;

means for identifying a tile of the intermediate graphical representation touched by said received image, in response to receiving the image data;

means for marking the identified tile for rendering based on a number of the received images for the identified tile compared to a determined number of images contributing to the identified tile, the number of images contributing to said tile being determined using image metadata of said images; and means for rendering the document using the marked tile.

According to still another aspect of the present disclosure there is provided a non-transitory computer readable medium having a computer program stored thereon for rendering a document described in a page description language, the computer program comprising:

code for receiving the document comprising a plurality of images;

code for forming an intermediate graphical representation of the document based on image metadata for the images, the intermediate graphical representation being subdivided into a plurality of tiles;

code for receiving image data of one of said images to render the intermediate graphical representation;

code for identifying a tile of the intermediate graphical representation touched by said received image, in response to receiving the image data;

code for marking the identified tile for rendering based on a number of the received images for the identified tile compared to a determined number of images contributing to the identified tile, the number of images contributing to said tile being determined using image metadata of said images; and code for rendering the document using the marked tile.

According to still another aspect of the present disclosure, there is provided a method of rendering a document described in a page description language, the method comprising:

receiving the document comprising images;

forming an intermediate graphical representation of the document, the intermediate graphical representation being subdivided into a plurality of tiles;

determining a number of said images contributing to at least one of said tiles in the intermediate graphical representation, said number of images being determined using image metadata of said images;

receiving image data of one of said images to render the intermediate graphical representation;

prioritising said tile for rendering depending on whether the received image data is required to render said tile; and rendering said document using the prioritised tile.

According to still another aspect of the present disclosure, there is provided a method of rendering a document described in a page description language, the method comprising:

receiving the document comprising a plurality of images;

forming an intermediate graphical representation of the document based on image metadata for the images, the intermediate graphical representation being subdivided into a plurality of tiles;

determining a number of said images contributing to at least one of said tiles in the intermediate graphical representation, said number of images being determined using image metadata of said images;

receiving image data of one of said images to render the intermediate graphical representation;

comparing the determined number of said images contributing to said tile to a number of images touching said tile, the images touching said tile being determined using the received image data;

marking said tile for rendering based on the comparison; and rendering the document using the marked tile.

Other aspects are also disclosed.

BRIEF DESCRIPTION OF THE DRAWINGS

One or more embodiments of the invention will now be described with reference to the following drawings, in which FIGS. 1A and 1B form a schematic block diagram showing a monolithic printing system, upon which the various arrangements described can be practiced;

FIG. 11 is a diagram showing the state of an example tile-ref ("tile reference") map containing two unprocessed images;

DETAILED DESCRIPTION INCLUDING BEST MODE

Figure 1A:
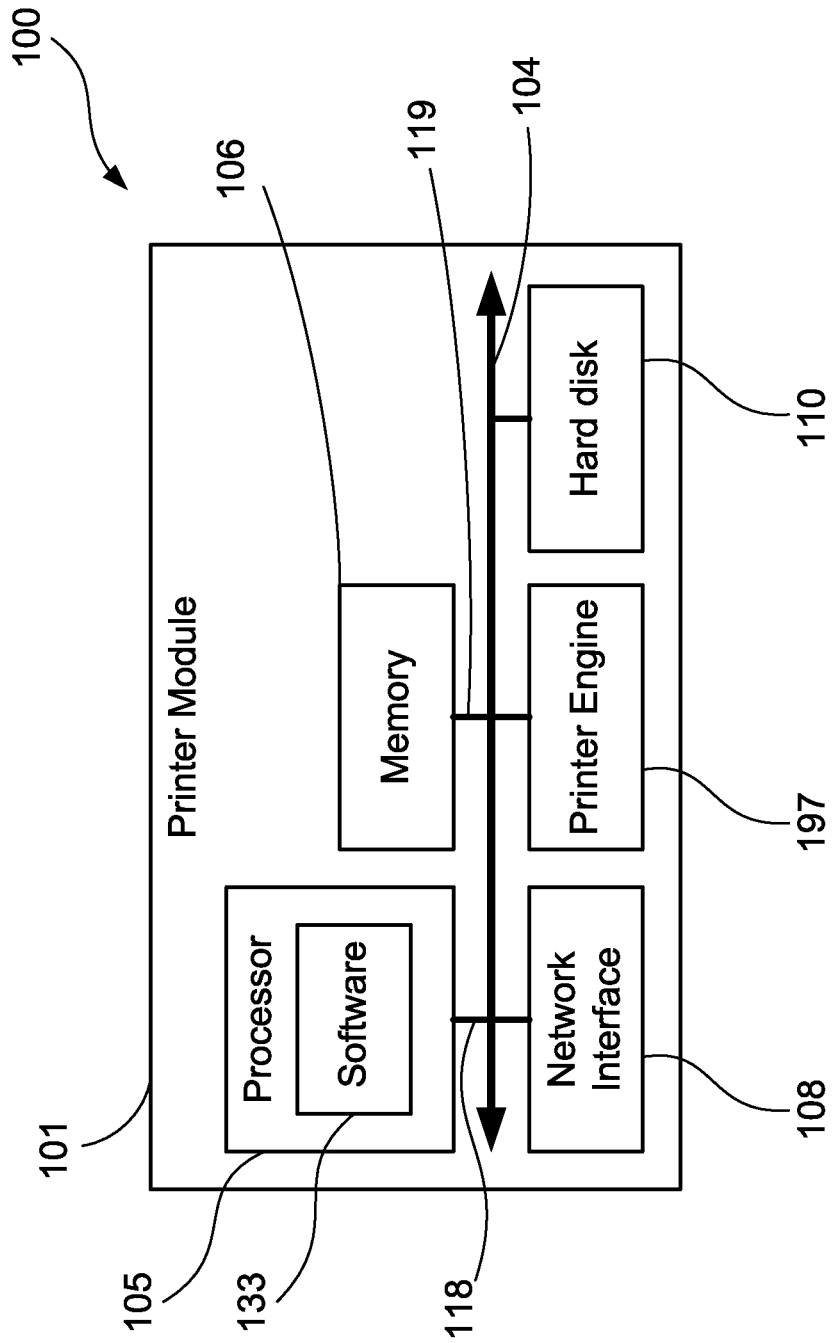

Where reference is made in any one or more of the accompanying drawings to steps and/or features, which have the same reference numerals, those steps and/or features have for the purposes of this description the same function (s) or operation(s), unless the contrary intention appears.

Print rendering systems are normally provided with a source document in a page description language, such as Portable Document Format (PDF) developed by Adobe Systems Inc. Such print rendering systems generate pixel data output that is suitable for sending the pixel data to printer hardware for drawing on an output medium.

A print rendering system may for example take drawing requests or instructions from the PDL and render the drawing instructions directly into a full-page frame-buffer. One method for rendering drawing instructions directly into a full-page frame-buffer is known as Painter's Algorithm. Alternatively, the drawing instructions can be rendered by converting the drawing instructions to one or more intermediate formats. The present disclosure relates to printing systems that use a specific intermediate format, known as a fillmap data structure, or simply a fillmap.

Figure 1B:
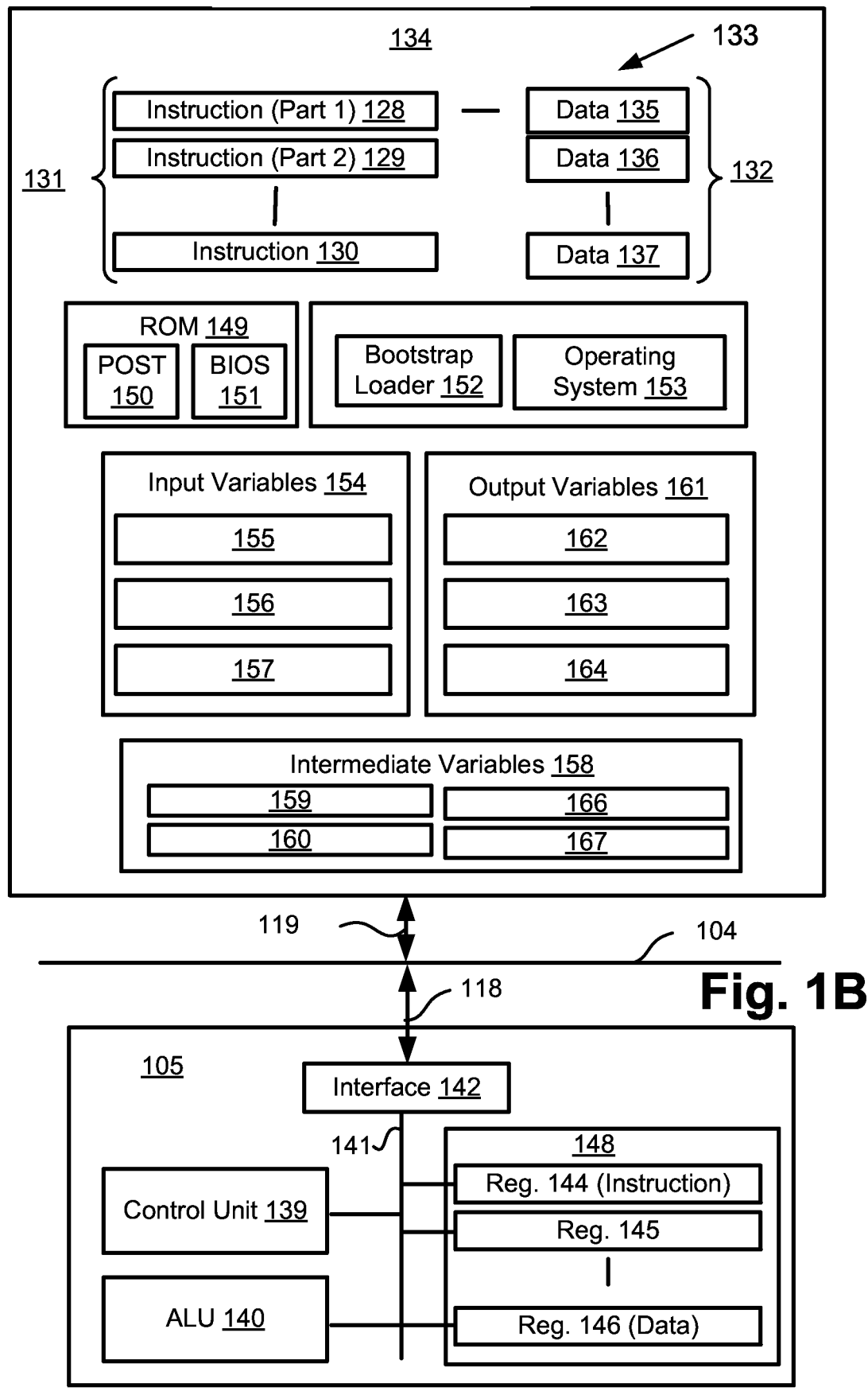

FIGS. 1A and 1B depict a monolithic printing system 100, upon which the various arrangements described can be practiced.

As seen in FIG. 1, the system 100 comprises a printer module 101. The module 101 comprises at least one processor unit 105, and memory unit 106. For example, the memory unit 106 may be formed by a combination of memory types including semiconductor read only memory (ROM), non-volatile random access memory (RAM) and volatile RAM. Other storage devices such as a hard disk drive (HDD) 110 are also provided.

The system 100 comprises an input/output (I/O) network interface 108 for an external Modulator-Demodulator (Modem) transceiver device 116. The modem 116 may be used by the printer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120. In some implementations, the modem 116 may be incorporated within the interface 108.

The components 105 to 110 typically communicate via an interconnected bus 104 and in a manner that results in a conventional mode of operation of the system 100. For example, the processor 105 is coupled to the bus 104 using a connection 118. Likewise, the memory 106 is coupled to the bus 104 by a connection 119.

Methods of rendering described below may be implemented using the printing system 100 wherein the processes of FIG. 5, to be described, may be implemented as one or more software application programs 133 executable within the system 100. In particular, the steps of the described methods may be effected by instructions 131 (see FIG. 1B) in the software 133 that are carried out within the system 100. The software instructions 131 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 may be stored in a computer readable medium, including the storage devices described below, for example. The software 133 is typically stored in the HDD 110 or the memory 106. The software is loaded into the system 100 from the computer readable medium, and then executed by the system 100. A computer readable medium having such software or computer program recorded on the computer readable medium is a computer program product. The use of the computer program product in the system 100 preferably effects an advantageous apparatus for implementing the described methods.

In some instances, the application programs 133 may be supplied to the user encoded on one or more CD-ROMs, or alternatively may be read by the user from the networks 120. Still further, the software 133 can also be loaded into the module 101 from other computer readable media. Computer readable storage media refers to any non-transitory tangible storage medium that provides recorded instructions and/or data to the printing system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the printing system 100. Examples of transitory or non-tangible computer readable transmission media that may also participate in the provision of software, application programs, instructions and/or data to the printing system 100 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon a display of the system 100.

FIG. 1B is a detailed schematic block diagram of the processor 105 and a "memory" 134. The memory 134 represents a logical aggregation of all the memory modules (including the HDD 110) that can be accessed by the printing system 100 in FIG. 1A.

When the printer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the printing system 100 to ensure proper functioning and typically checks the processor 105, the memory 134 (110, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (110, 106) to ensure that each process or application running on the printer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the printing system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across the network 120, data retrieved from one of the storage devices 106, 110. The execution of a set of the instructions may in some cases result in output of data. Execution may also involve storing data or variables to the memory 134.

The disclosed rendering arrangements use input variables 154, which are stored in the memory 134 in corresponding memory locations 155, 156, 157. The disclosed arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Figure 5:
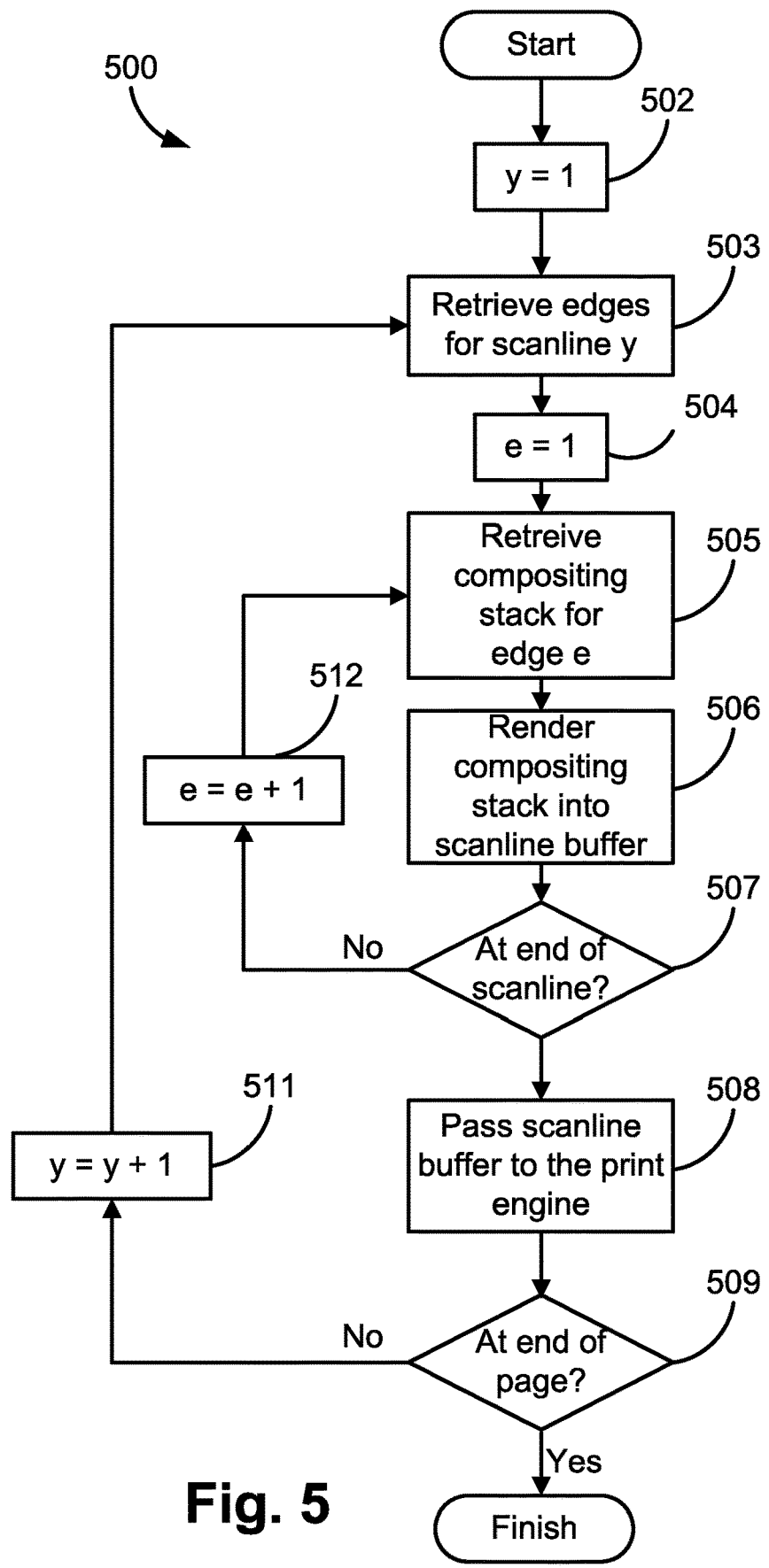
FIG. 5 is a flowchart showing a method for rendering a fillmap to pixel data.

Each step or sub-process in the processes of FIG. 5 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The printing system 100 accepts PDL data from a document creation application (e.g., a word processor or web browser) and converts the PDL data to an intermediate graphical representation (or "intermediate format data"), known as a fillmap. The system 100 renders the fillmap data to output pixel data that is passed to a printer engine 197 for hard copy reproduction. Alternatively, the print data can be stored to the hard drive 110 for later output. As described above, the software 133 is typically stored in the HDD 110 or the memory 106, which is also used for temporary storage of data during the processing performed within the system 100. As described above, the memory 106 may have a combination of memory types. The memory 106 may include read-only memory (ROM), non-volatile random-access memory (RAM) and volatile RAM. Often, for notebook, desktop or server (e.g. cloud) computing implementations of the system 100, the non-volatile RAM may be formed by magnetic disk drive or similar storage device.

For highly portable implementations, such as where the module 101 is a smartphone or tablet device, or the like, the non-volatile RAM is typically formed by silicon devices implementing a so-called solid state hard drive (SSHD). In such a portable implementation, the memory 106 includes or is formed by non-transitory tangible computer readable storage media within which the software 133, at least, may be stored.

Alternatively, a printing system can be implemented in two separate parts. For example, part of the processing of the document to be rendered may be performed in a driver or on a server, with the remaining processing being performed in a separate printer device. Such a split system allows the printer hardware to have reduced functionality, while still maintaining overall system throughput.

Figure 2:
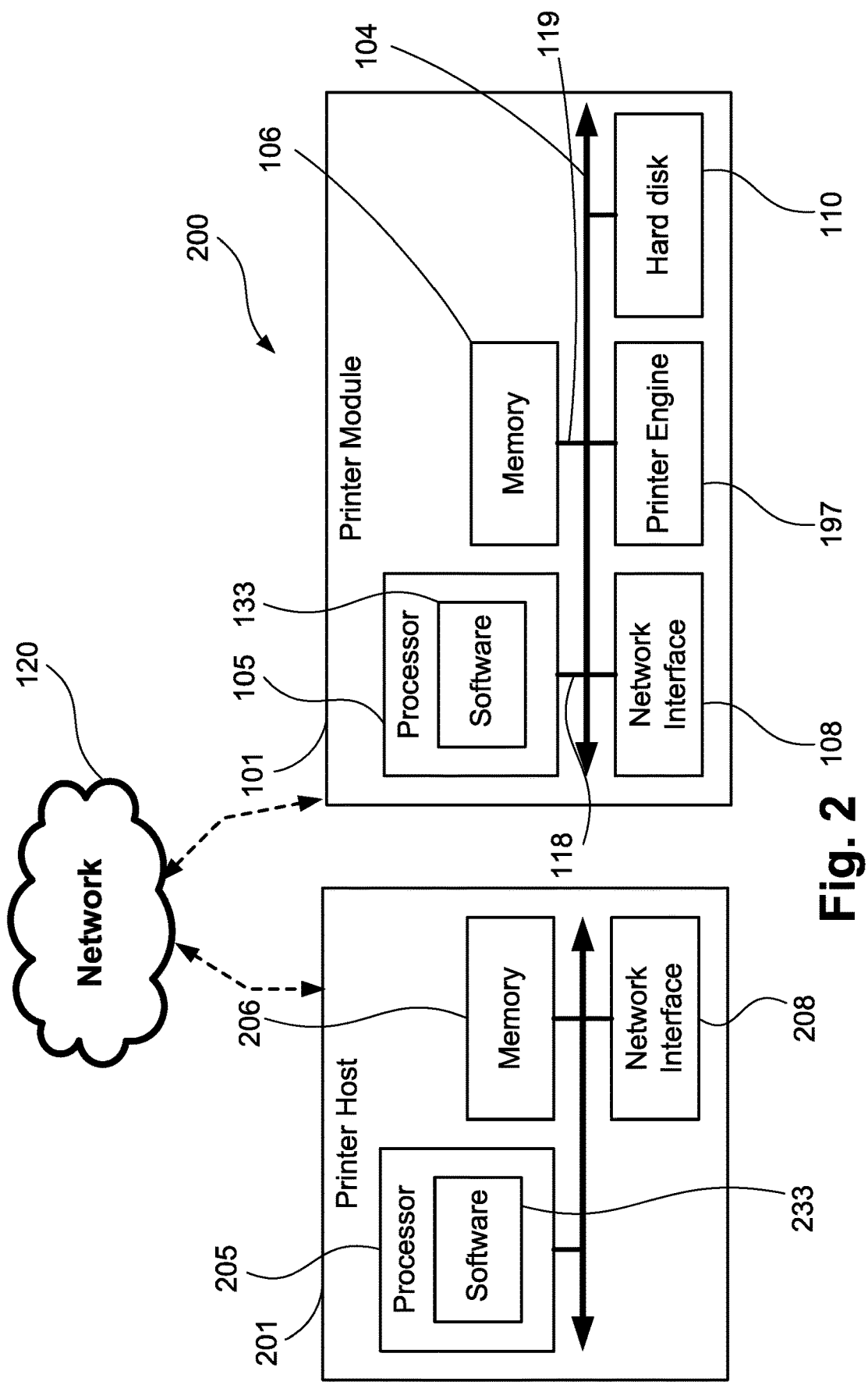
FIG. 2 is a schematic block diagram showing a split printing system, upon which the various arrangements described can be practiced.

FIG. 2 shows a split printing system 200, upon which the various arrangements described can alternatively be practiced. The system 200 comprises a printer host module 201. The module 201 comprises a processor 205, memory 206 and a network interface 208, all connected to a local bus 204.

One or more steps of the methods of rendering described below may be implemented using the printing system 200 wherein the processes of FIG. 5, to be described, may be implemented as one or more software application programs 233 executable within the system 200 in a similar manner to the software application 133 executing on the module 101. The software 233 is typically stored in the memory 206. The printer host module 201 accepts PDL data from a document creation application (such as a word processor or web browser, for example) and converts the PDL data to an intermediate graphical representation (or "intermediate format data"), known as a fillmap. The fillmap is transmitted via the network interface 208 and the network 120 to an image reproduction device, such as the printer module 101. By virtue of the configuration of the network 120, the host module 201 and the module 101 are typically remote from each other. For example, the host module 201 may be a server in a cloud computing environment and the printer module 101 may be located in an office or a private residence.

The communications network 120 may be a wide-area network (WAN), such as the Internet, a cellular telecommunications network, or a private WAN.

As described above. the network 120 is a typically a communications network such as a wide area network (WAN). Alternatively, the network 120 may be a local area network. The network 120 may be implemented in a wired form, a wireless form, or a combination of the wired and wireless technology.

The network 120 generally comprises at least one intervening communications device, such as a router, switch or node, interposed between the host module 201 and the printer module 101. In some instances, the network 120 may be formed by a simple direct connection between the host module 201 and the printer module 101, such as a single cable connection or, for example a Bluetooth® wireless connection.

As described above, the printer module 101 comprises software 133 being executed by the processor 105. The printer module 101 receives the fillmap data via the network interface 108 and renders the fillmap data to output pixel data that is passed to the printer engine 197 for hard copy reproduction.

As described above, the software 233 may be stored in the memory 206. The memory 206 is also used for temporary storage of data during the processing performed within the module 201. The memory 206 may be formed by a combination of memory types including read-only memory (ROM), non-volatile random-access memory (RAM) and volatile RAM. For notebook, desktop or server (e.g. cloud) computing implementations of the host module 201, the non-volatile RAM may be formed by magnetic disk drive or similar storage device.

For highly portable implementations, such as where the host module 201 is a smartphone or tablet device, or the like, the non-volatile RAM is typically formed by silicon devices implementing a solid state hard drive (SSHD). As such, the memory 206 may include or be formed by non-transitory tangible computer readable storage media within which the software 233, at least, may be stored. Whilst the (SSHD) memory may be of limited capacity when compared with desktop or server computers, such memory capacity is typically substantially greater than that of the memory 106 of the printer module 101, and thus does not limit printing operations.

The software 233 may be supplied to the host module 201 for storage via portable non-transitory tangible computer readable storage media connectable to the printer host module 201. The software 233 may be loaded into the module 201 from such non-transitory tangible computer readable storage media. Alternatively, the software 233 may be read from the network 120.

As described above, the software 133 is typically stored in the HDD 110 or the memory 106. The memory 106 is also used for temporary storage of print data during the processing performed within the printer module 101. As described above, the memory 106 may be formed by a combination of memory types including read-only memory (ROM), non-volatile random-access memory (RAM) and volatile RAM. The software 133 may be stored in ROM and may not be to be altered after manufacture without the ROM being replaced. Where the software 133 is stored in non-volatile RAM, the software 133 may be upgraded or changed from time to time, provided sufficient memory capacity is available. In some instances the non-volatile RAM may be formed by magnetic disk drive or similar storage device. As such the memory 104 may include or be formed by non-transitory tangible computer readable storage media within which the device software 133, at least, may be stored.

The described methods of rendering will described with reference to the printing system 100. However, as described above, the methods of rendering described below may also be implemented using the printing system 200.

Figure 3:
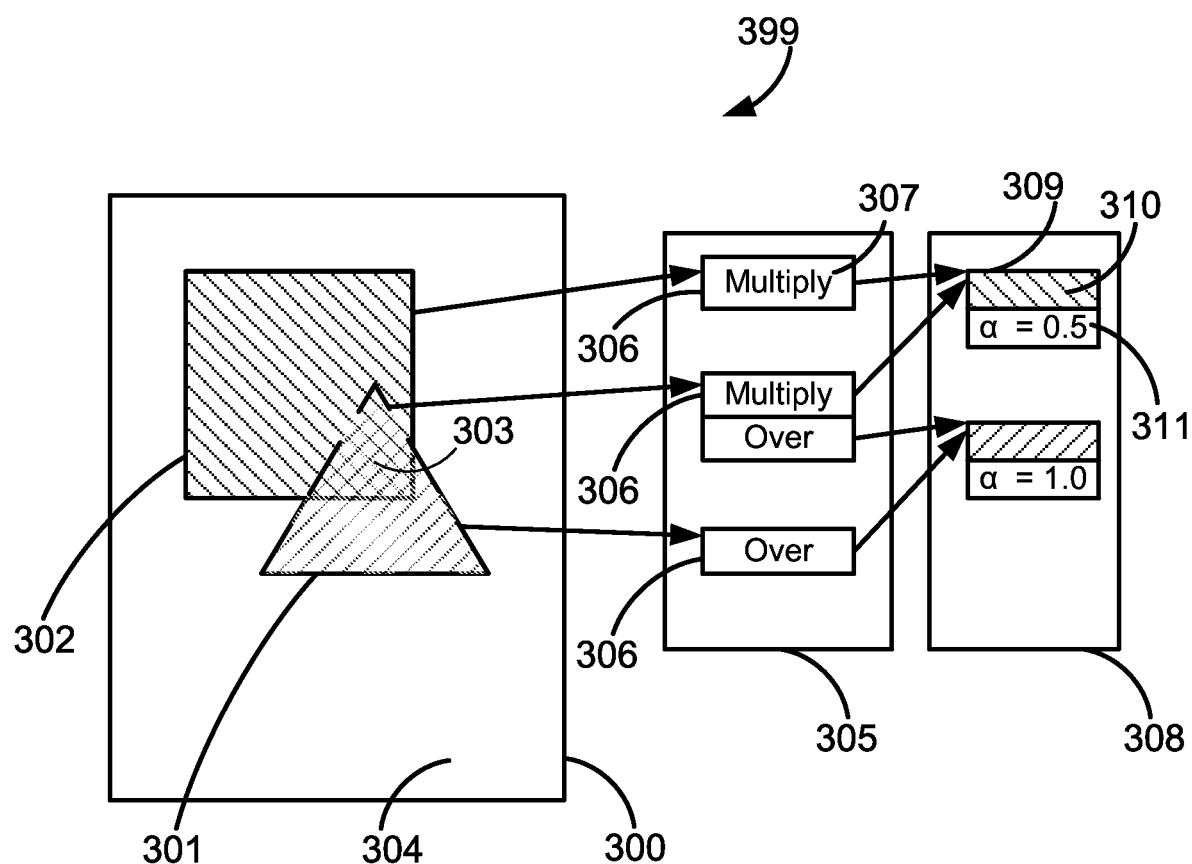
FIG. 3 the structure of an example fillmap.

A fillmap describes the content of a single page in a print document. The data structure of a fillmap 399 is shown in FIG. 3. In the fillmap 399, the content of a page 300 to be reproduced by printing is divided into non-overlapping regions 301, 302, 303, including background regions 304. Each region of a fillmap is an area containing a particular combination of contributing PDL objects. The extent of each region is described by edges that are aligned with a pixel grid able to be printed by the print engine 197. The content of each region 301, 302 and −303 is defined by a set of compositing stacks 305. Each compositing stack is an ordered list of level appearances 306, each of which corresponds to an object that contributes to the appearance of the corresponding region. Each level appearance 306 references either a single fill or a group of fills in a fill store 308, generally formed within the memory 106. The level appearance 306 also defines one or more compositing operations 307 that are used to draw the group or object on the underlying objects. In the example of FIG. 3, the compositing operations Multiply and Over are used by the three level appearances 306. A fill 309 describes the colour 310 and alpha 311 for the pixels of the corresponding non-overlapping region. The collection of fills 308 describes the regions on the page 300. The collection of fills 308, the compositing stacks 305 and the regions 301, 302 and 303 form the fillmap 399 for the page 300. Fills include flat regions of colour, linear and radial gradients and images. For example, the fill 309 may consist of a red colour and a level appearance 306 could composite the red fill on an underlying object using the "Multiply" blend mode, so that the compositing stack 305 would comprise the red level appearance along with the level appearances of the underlying objects.

In the example of FIG. 3, there is no level appearance illustrated for the background region 304. The region 304 can be assumed to be the implicit destination of the lowest compositing operation in each stack 305. In other implementations, an explicit entry representing the background region 304 may be inserted in the compositing stack 305. As shown in FIG. 3, the structure of the fillmap 399 may be considered an intermediate format which uses non-overlapping regions that reference compositing stacks that in turn reference fills for a page where, edges associated with objects are pixel-aligned.

The fillmap 399 may be used by a printing system, such as the printing system 100, as an intermediate graphical representation. The fillmap 399 may also be referred to as an "intermediate format". The printing system 100 is a fillmap-based print rendering system.

Figure 4A:
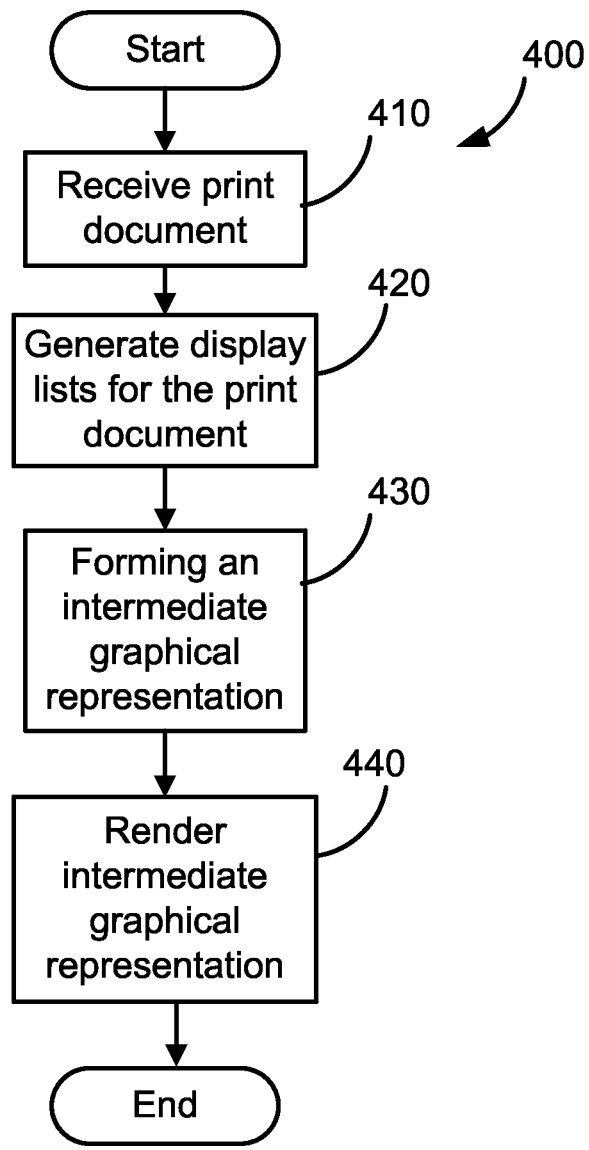
FIG. 4A is a schematic block diagram showing a method of rendering a document.

A method 400 of rendering a page of document described in a page description language, using the system 100, will now be described with reference to FIG. 4A. The method 100 may be implemented as one or more software code modules of the software application program 133, resident in the hard disk drive 110 of the printer module 101, and being controlled in its execution by the processor 105. The method 400 will described with reference to the printing system 100 and the printing module 101. However, the method 400 may also be implemented using the printing system 200.

Figure 4B:
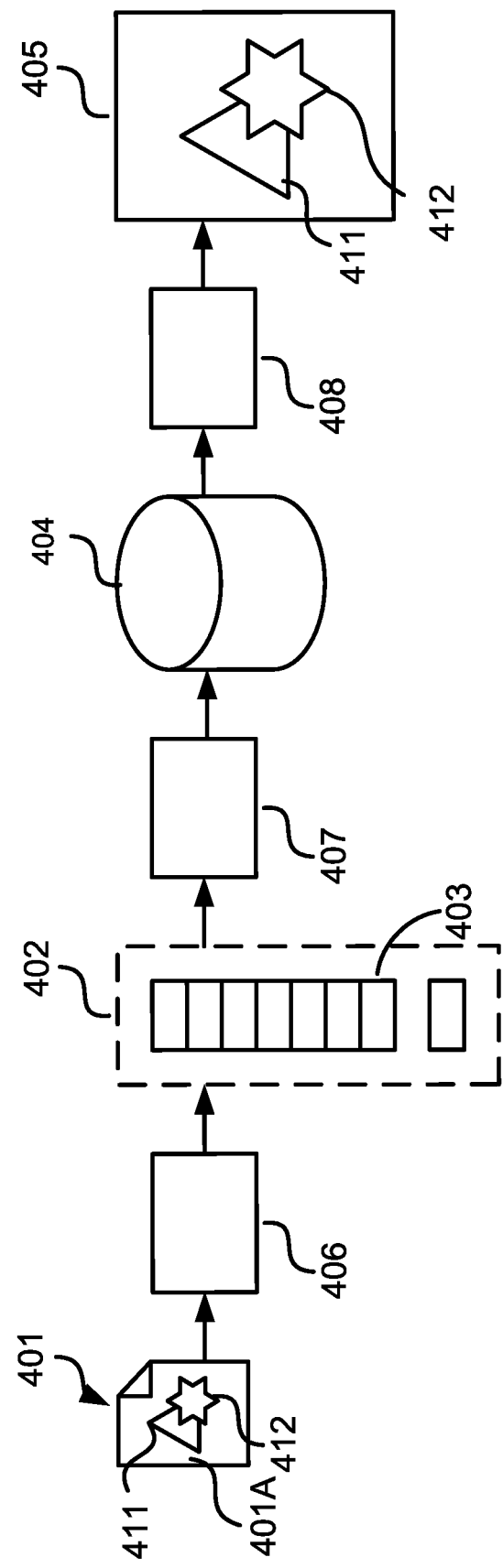
FIG. 4B is a diagram showing the flow of data from a page description language to output pixels.

The method 400 will be described by way of example with reference to a document 401 shown in FIG. 4B. FIG. 4B shows example high-level processing flow of the system 100 in rendering the document 401.

The method 400 begins at a receiving step 410, where a print document 401 is received by the system 100 under execution of the processor 105. FIG. 4B shows a page 401A of the print document 401. The print document 401 may comprise a plurality of such pages. The page 401A is provided to the system 100, for example, from the memory 106. The page 401A is described by page description language (PDL) data. Examples of page description languages include portable document format (PDF), PostScript™ and Open XML Paper Specification (XPS). As seen in FIG. 4B, the page 401A comprises a plurality of graphical objects 411, 412. One or more of the graphical objects 411, 412 may be images.

At processing step 420, the page 401A is read and processed by a PDL interpreter module (PDLi) 406 under execution of the processor 105. The PDL interpreter module (PDLi) 406 converts content of the page 401A into a sequence of drawing instructions which may be stored in the memory 106. The PDL interpreter module (PDLi) 406 may be implemented as one or more software code modules of the software application program 133. The drawing instructions are accumulated in one or more z-ordered display lists 402. An entry 403 in the display list 402 can represent a drawing instruction. Generation of the display lists at step 420 will be described in detail below.

Then at forming step 430, the display list 402 is then passed to a fillmap generator module 407 which is used for forming an intermediate graphical representation 404 of the page 401A. The fillmap generator module 407 may be implemented as one or more software code modules of the software application program 133. The fillmap generator module 407 converts the data of the display list 402 into an intermediate graphical representation in the form of a fillmap 404 comprising fillmap data. As described in detail below, the fillmap 404 is formed based on image metadata for the images of the page 401A. As also described, the fillmap 404 is subdivided into a plurality of tiles.

When all the display lists 402 for the page 401A of the print document 401 have been received by the fillmap generator module 407 and the fillmap 404 has been formed, the fillmap 404 is passed to a fillmap renderer module 408, at rendering step 440. The fillmap renderer module 408 may be implemented as one or more software code modules of the software application program 133. At step 440, the intermediate graphical representation in the form of the fillmap 404 is rendered into a page of output pixel data 405. The page of output pixel data 405 may be passed to a print engine for hard-copy reproduction. A method 500 of rendering the fillmap 440 to pixel data, as executed at step 440, will be described with reference to FIG. 5.

The method 400 is described in more detail in the following sections.

Display List Generation

The generation of the display lists, as performed by the PDLi module 406 at step 420, will now be described. In the example of FIG. 4B, the PDL interpreter module (PDLi) 406, under execution of the processor 105, takes a sequence of drawing instructions from the PDL document (e.g., page 401A) and converts the drawings instructions into a list that can be manipulated. The available types of drawing instructions are independent of the page description language (PDL) used to describe the page 401A. The independence of the drawing instructions allows different PDLi implementations to provide data to the same printing system, such as the printing system 100. Examples of the drawing instructions include:

(i) instructions providing global information about page content for the page 401A. The global information may include, for example, page size, page affine transformation, colour space information and device resolution;

(ii) instructions drawing an objects on a page by providing data specifying shape, stroking and/or filling content for drawing an object on the page 401A. The data may also include optional clip data of the object, and a compositing operation that defines how the object composites with any objects underneath the object in the z-order of the page 401A; and (iii) instructions providing a set of properties associated with a group of objects, where the set of properties apply to all member objects of the group.

As described above in the example of FIG. 4B, the print document is in the form of a page 401A. Each graphical object (e.g., 411, 412) that is drawn onto the page 401A is added to a display list at step 420. Each display list entry contains information about the shape, colour, and the compositing operation of the object. The compositing operation specifies how the object should be drawn over any underlying objects on the page 401A.

The object shape can be defined by a set of paths or glyphs, where a glyph is a symbol or character. The shape of the object can be stroked, filled, or both stroked and filled. Similarly, an object can have optional clipping information, which is also supplied by a set of paths or one or more glyphs. The clipping information restricts the visibility of a clipped object. In one arrangement of the described printing methods, clipping boundaries may be represented as display list entries that refer to the display list entries which the clipping boundaries clip. In an alternative arrangement, each clipped display list entry has a reference to the clipping boundaries that clip the clipped display list entry.

The colour appearance of a filled area or stroked path is provided by a "fill definition". There are various types of fills, including:

(i) a region of solid colour, or "flat";

(ii) a region of colour interpolated between two geometric points and associated colours, known as a 2-point gradient;

(iii) a region of colour interpolated between three geometric points and colours associated with the geometric points, known as a 3-point gradient;

(iv) a region of colour interpolated between more than two collinear geometric points and colours associated with the collinear geometric points, known as a multi-stop gradient;

(v) a region of colour interpolated between two geometric circles and colours associated with the geometric circles, known as a radial gradient; and (vi) a region of colour defined by an image, where the image can be a single instance or can be repetitively tiled across and down a page, such as the page 401, at any angular orientation.

Images are a special case of fills. Because image data can be very large, special methods are required to store and manage images when creating and processing display lists. An image that is contained within a PDL document, such as the page 401A, is typically compressed and encoded. In addition, images can also have various associated parameters that define additional processing steps that need to be performed on the image data before the image data is in a suitable form for rendering. Examples of processing steps that may be needed for image data include the following:

(i) decoding of the image data into binary form;

(ii) decompression of the image binary data into pixel data;

(iii) downscaling of the pixel data;

(iv) pre-rotation of the image data into page orientation;

(v) conversion of the pixel data from a colour space for the image into the colour space of a device such as the module 101;

(vi) breaking up of the image data into tiles;

(vii) compression of the individual image tiles; or (viii) half-toning image data to fit in a reduced colour output space.

Even if not all of the processing steps (i) to (viii) are required, the image processing path can take significant time and resources to be performed.

Fillmap Generation

The conversion of the display list 402 into an intermediate graphical representation in the form of the fillmap 404, as performed by the fillmap generator module 407 at step 430, will now be described. The fillmap 407 is generated by processing display list objects in increasing Y-order (i.e. from the top of the page 401A to the bottom).

A fillmap is a device-resolution data structure. That is, the spatial data (i.e., the edges that delineate the page 401A into regions) within a fillmap are aligned with the pixel grid used by the print engine. Consequently, a fillmap created for a specific device resolution (e.g. 600 dpi) cannot be rendered on a print device which has a different resolution (e.g. 1200 dpi). The data within a fillmap can cover the top-left printer device pixel through to the bottom-right pixel. Alternatively, the fillmap may only be defined for part of a page, if the content does not cover the whole page.

Before processing, all objects in the display list 402 are sorted in Y-increasing order. That is, entries in the list 402 are ordered so that objects that start nearer the top of the page 401A appear before objects that appear further down the page 401A. The shape information for each entry in the display list 402 is expanded into one or more sub-paths. The shapes for a text object are first obtained from a font engine before being placed into the display list 402.

The generation of the fillmap 404 starts at a first scan line in the page 401A. Processing continues one scan line at a time until all the objects in the display list 402 have been processed, or the bottom of the page 401A is reached. At each scan line, the display list 402 is consulted. Any sub-paths that start on the current scan line are divided into Y-monotonic edges. Y-monotonic edges are edges that only increase in the Y direction (i.e. edges in the fillmap 402 do not decrease in Y direction). Any edges that start on the current scan line will be expanded into a set of straight-line vectors. Curved edges are vectorized such that the difference between the curved edge and the resultant straight-line vectors is below the resolution of an output device such as the module 101.

Once an edge has been converted into vectors, a scan conversion process is performed on the vectors. Scan conversion is the process of converting vectors in the coordinate system of the page 401A to fillmap edges that are aligned with the pixel grid of the output device. The determination of the pixel edges is based on the current pixel placement rule, which defines the pixels that are considered to be "inside" a shape. Two examples of pixel placement rules are as follows:

(i) grid intersect rule: where boundary pixels are considered inside if the centre of the pixel is inside the shape; and (ii) area intersect rule: where boundary pixels are considered inside if the boundary pixel touches any part of the shape.

Scan-conversion of each vector begins when fillmap generation processing reaches the first scan line which the vector can affect. The vector is then tracked for each scan line until processing reaches the final scan line which the vector can affect. For each scan line, the position of the intersection between the vector and the scan line is calculated. There are various scan-conversion methods which can be used, including Bresenham's algorithm, or solving the intersection in fixed or floating point calculations.

Each scan line is processed to generate a set of x-intercepts, corresponding to the positions where each pixel-aligned edge has been created from a vector that intercepts the scan line. Each x-intercept is labelled with a "z-level" (i.e., the ordering of the objects as the objects are painted on the page 401A), a "direction" (i.e., indicating whether the edge is an enabling or disabling edge) and a level appearance reference. There can be multiple pixel-aligned edges at the same x-intercept.

Once all the x-intercepts for a scan line have been determined, level processing is performed. The purpose of the level processing is to create a set of pixel-aligned fillmap edges corresponding to the x-intercepts. Each fillmap edge corresponds to the one or more x-intercepts at the same pixel. Associated with each fillmap edge is the set of level appearances that are active at the position of the edge. The set of level appearances is ordered by z-level, and is known as a "compositing stack". A compositing stack fully describes the colour and alpha appearance of a region associated with the edge).

A set of fillmap edges is determined for the scan line. The above process is repeated on the following scan lines. As processing proceeds down the page, the sets of edges for each scan line can be joined across the scan lines, leading to the creation of two-dimensional regions on the page 401A, denoted by the fillmap edges. By the end of the page 401A, the entire content of the page 401A has been converted to a set of device pixel-aligned regions, each of which references a compositing stack that describes the content. To reduce memory usage and to facilitate efficient rendering, the set of edges can be partitioned into tiles, which are then compressed separately and stored (e.g., in the memory 106) for later retrieval.

Fillmap Rendering

As described above, the regions in a fillmap are delineated by edges that are aligned with the pixel grid of the print engine. As a result, by the time rendering is performed, all output pixels have been assigned to a compositing stack. Therefore, no geometric calculations are needed to determine the source of the colour information for the output pixels. A method 500 of rendering the fillmap 440, as performed by the renderer module 408 at step 440 will now be described with reference to FIG. 5. The method 500 may be implemented as one or more software code modules of the software application program 133, resident in the hard disk drive 110 of the printer module 101, and being controlled in its execution by the processor 105.

The method 500 is executed when the fillmap 440 is ready to be rendered. The fillmap 440 is rendered one scan line at a time, starting from the top of the page 401A.

The method 500 begins at initialising step 502, where a loop is initialised by setting a row counter, y, to a first row (i.e., y=1). At retrieving step 503, the edges that intersect the current scan line are retrieved from a fillmap edge store configured, for example, within memory 206. The scan line is rendered by considering each edge in turn from left to right, and generating pixel data for the span between a current edge and a next edge (or the end of the scan line).

The method 500 continues to initialising step 504, where a loop is initialised by setting an edge counter, e, to a first value (i.e., e=1). At a compositing stack retrieving step 505, the compositing stack associated with the edge, e, is retrieved from a compositing stack store configured, for example, within the memory 106. The compositing stack retrieved at step 506 is evaluated for each pixel of the edge to create pixel data for the edge, as will be described in more detail below. The pixel data for the edge is rendered into a pixel buffer configured within the memory 106.

At decision step 507, if there are more edges in the scan line, then the method proceeds to step 512. The edge index, e, is incremented at step 512 (i.e., e=e+1) and processing loops back to step 505 where the compositing stack for a next edge is read at step 505.

Otherwise, if there are no more edges in the scan line, then the method 500 has finished rendering all the pixels for the current scan line and the method 500 proceeds to passing step 508. At step 508, the pixel buffer is passed to the print engine to be printed on the page 401A. If there are more scan lines in the fillmap 440 to be rendered at decision step 509, then the method 500 proceeds to incrementing step 511. At step 511, the row counter, y, is incremented (i.e., y=y+1) and processing loops back to retrieve step 503 where the edges that intersect scan line, y, are retrieved. Otherwise, the method 500 has finished rendering the fillmap 440.

The method 500 above describes rendering scan lines one at a time. There are other methods of processing fillmap data that may be more useful in different printing systems. For example, the scan lines may be rendered in horizontal page-width strips, which are then passed to the print engine. Rendered the scan lines in horizontal page-width strips, allows the print engine to process a strip of data while the next strip is being rendered. Alternatively, the page 401A may be divided into vertical page-height strips or tiles and each strip or tile rendered as a single entity, where dividing the page 401A into vertical page-height strips is a more efficient method of operation.

Parallel Processing

As noted above, the reading and processing of image data from the page description language (PDL) can take a significant amount of time. If the printing system 100 supports parallel processing, then the image processing task can be off-loaded to one or more separate processing threads. The display list generation and fillmap generation can then proceed independently, which is possible because the processed image pixel data is not required until the fillmap rendering at step 440.

The division of fillmap edges into tiles gives rise to an opportunity for parallelising fillmap rendering. The task of rendering a fillmap can be broken down into independent tasks rendering some fillmap tiles, each of which can be performed independently of the other tasks so that the fillmap tiles are rendered in parallel. If the printing system 100 has multiple cores available for rendering, breaking the fillmap rendering method 400 into parallel tasks can result in significantly faster processing.

Figure 6:
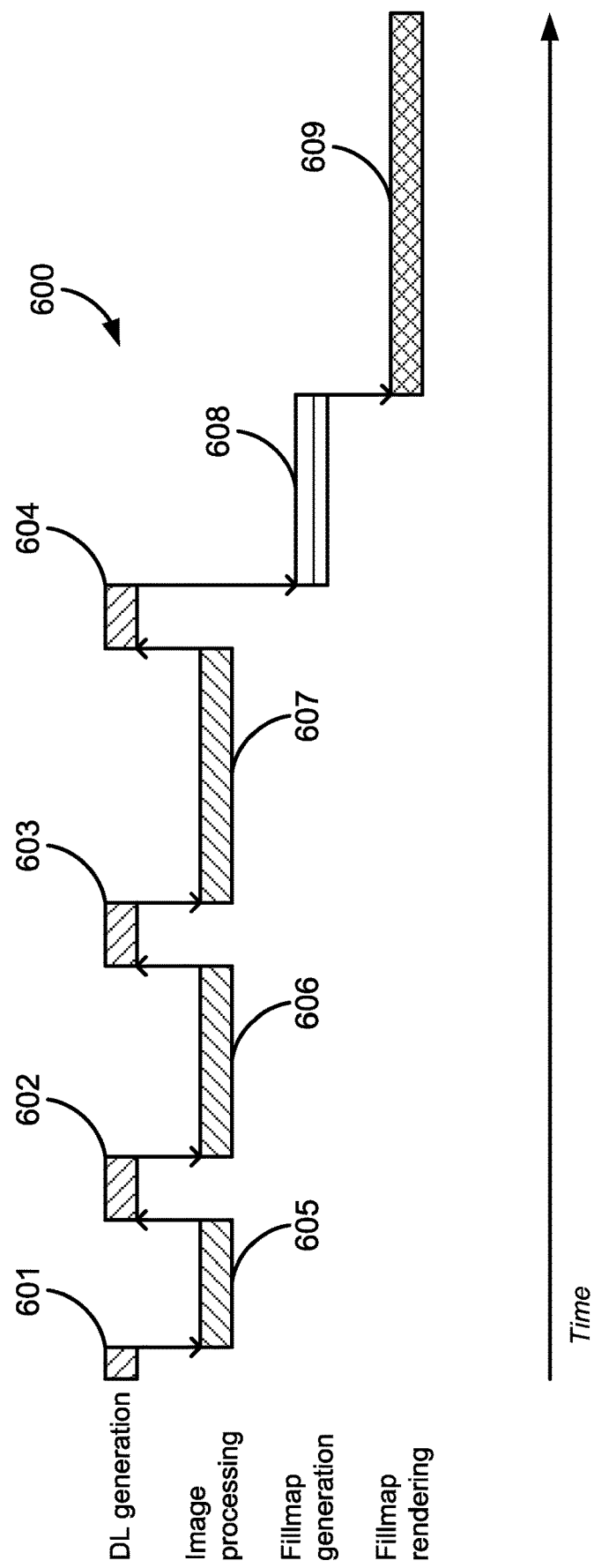
FIG. 6 shows a timeline of page rendering in a single-threaded system.

FIG. 6 shows the processing timeline 600 for rendering a page with three embedded images 605, 606, 607 on the system 100 when the system 100 is a single-threaded system. In the example of FIG. 6, the generation of the display lists at step 420 has been broken into four (4) parts (or "tasks") 601, 602, 603, and 604. The generation of the display lists is suspended as each of the images is received from the PDL interpreter module (PDLi) 406 due to a need for performing extra processing, such as image compression/decompression, on the received image. Once the last display list (DL) generation task 604 has finished, a fillmap generation task 608 commences. When the fillmap generation task 608 is complete, a fillmap rendering task 609 is performed. Because system 100 is a single-threaded system in the example of FIG. 6, only one task is active at any one time.

Figure 7:
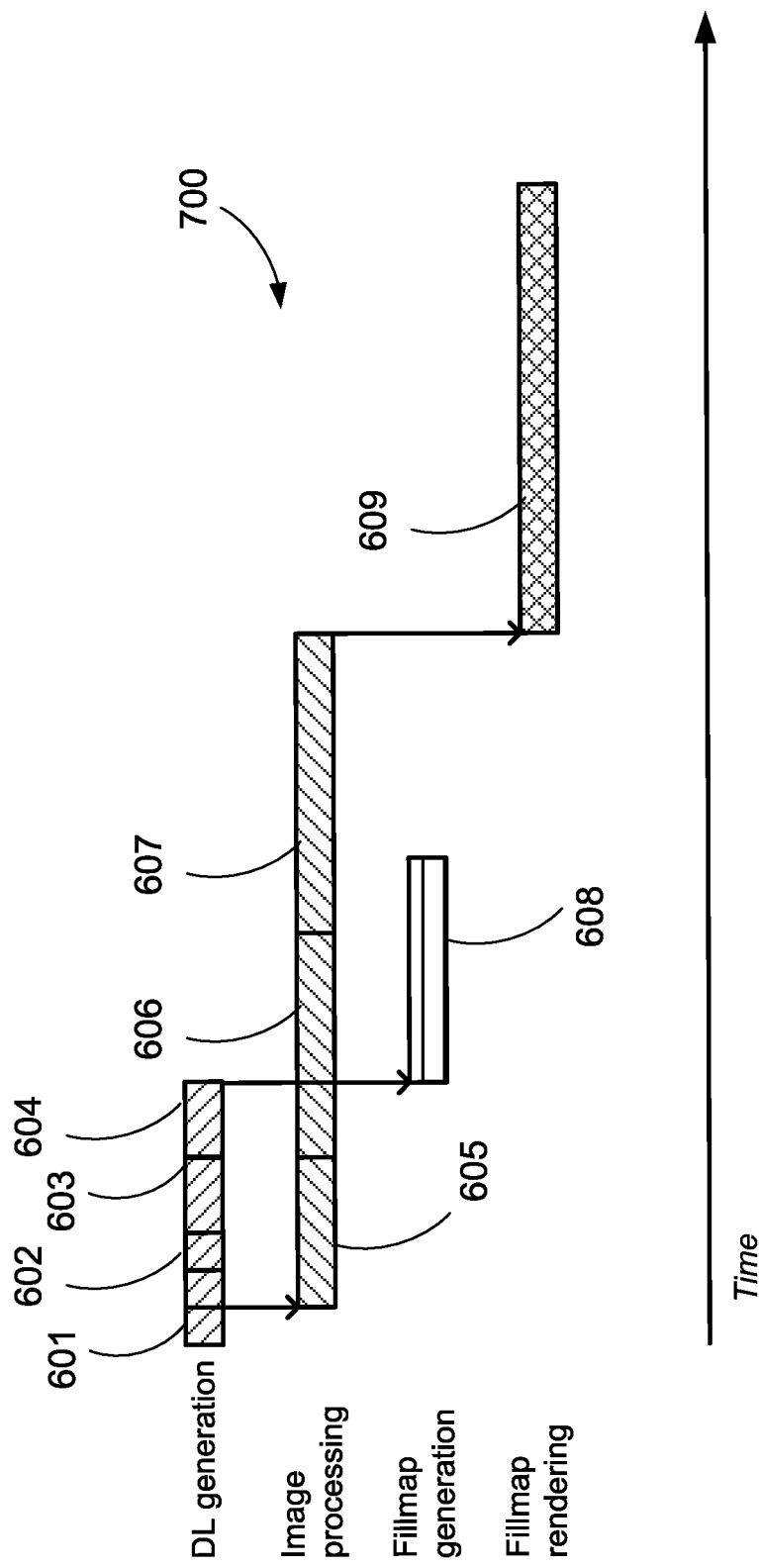
FIG. 7 shows a timeline of page rendering in a multi-threaded system.

In a multi-threaded system, some tasks can be performed in parallel. FIG. 7 shows a timeline 700 for rendering the page 401A of FIG. 6, when the system 100 is a multi-threaded system and the image processing is moved to a separate parallel task. As a result of moving the image processing to a separate parallel task, the display list generation tasks 601, 602, 603 and 604 can be performed sequentially without interruption. Similarly, the image processing tasks 605, 606 and 607 can also all be performed sequentially without interruption. The fillmap generation task 608 can now start earlier, as fillmap generation task 608 is dependent only on the completion of the display list generation tasks 601, 602, 603 and 604. The fillmap rendering task 609 cannot start until both the image processing tasks 605, 606 and 607 and the fillmap generation task 608 have both completed. In the example of FIG. 7, the image processing task 607 is the last task to finish. As seen in FIG. 7, the 100 system can perform the overall page rendering task faster by overlapping image reading with other tasks, when the system 100 is a multi-threaded system.

Split System Printing

As described above with reference to FIG. 2, the printing system 200 is split between the printer host module 201 and the module 101 components. In such a split system, print data is sent from the host module 201 to the module 101. In the specific printing systems described herein, the print data that is sent is a fillmap, such as the fillmap 404, and the module operates to render the fillmap and print the output. The fillmap is a complex data structure comprising fillmap edge tiles, compositing stacks, level appearances fills and other sundry objects. The actual memory layout and ordering of the data structures is dependent on both the processor and software build tools. The host module 201 and module 101 parts of the system 200 may differ in one or both of the processor and software build tools. As a result, fillmap data cannot be simply transferred from the module 201 to module 101.

To send a fillmap from one processing environment to another, and thereby permit the fillmap to be operatively interpretable across a variety of environments of differing builds, the fillmap is first converted to a serialised fillmap format. The serialised fillmap is a format that can be safely transferred to another environment, and reconstructed back into native data format. The serialised fillmap format does not include any hardware-specific formatting. For example, pointers cannot be included and byte-swapping may be necessary.

Apart from the need to transfer the serialised fillmap data structures from the host module 201 to the module 101, the building and rendering of a fillmap from a PDL page description is broadly the same as described above with reference to the system 100. However, transferring the data from one part of the system 200 to another creates a processing bottleneck. In the system 100, the rendering of the fillmap cannot start until all data has been received by the module 101 from the host module 201.

One bottleneck in the parallel processing of the systems 100 and 200 described above is that the fillmap rendering task cannot start until all the image data from the PDL document 401 has been read and processed. Because the fillmap data structure is tile-based, and each tile can be rendered independently, it is possible to remove the restriction of all of the image data having been read and processed in certain circumstances. The methods described above may be modified if it can be determined that a fillmap tile does not require any image data in order to be rendered, then rendering for that tile can commence on the systems 100 and 200 as soon as fillmap generation is finished, even if image processing is still taking place.

Figure 8:
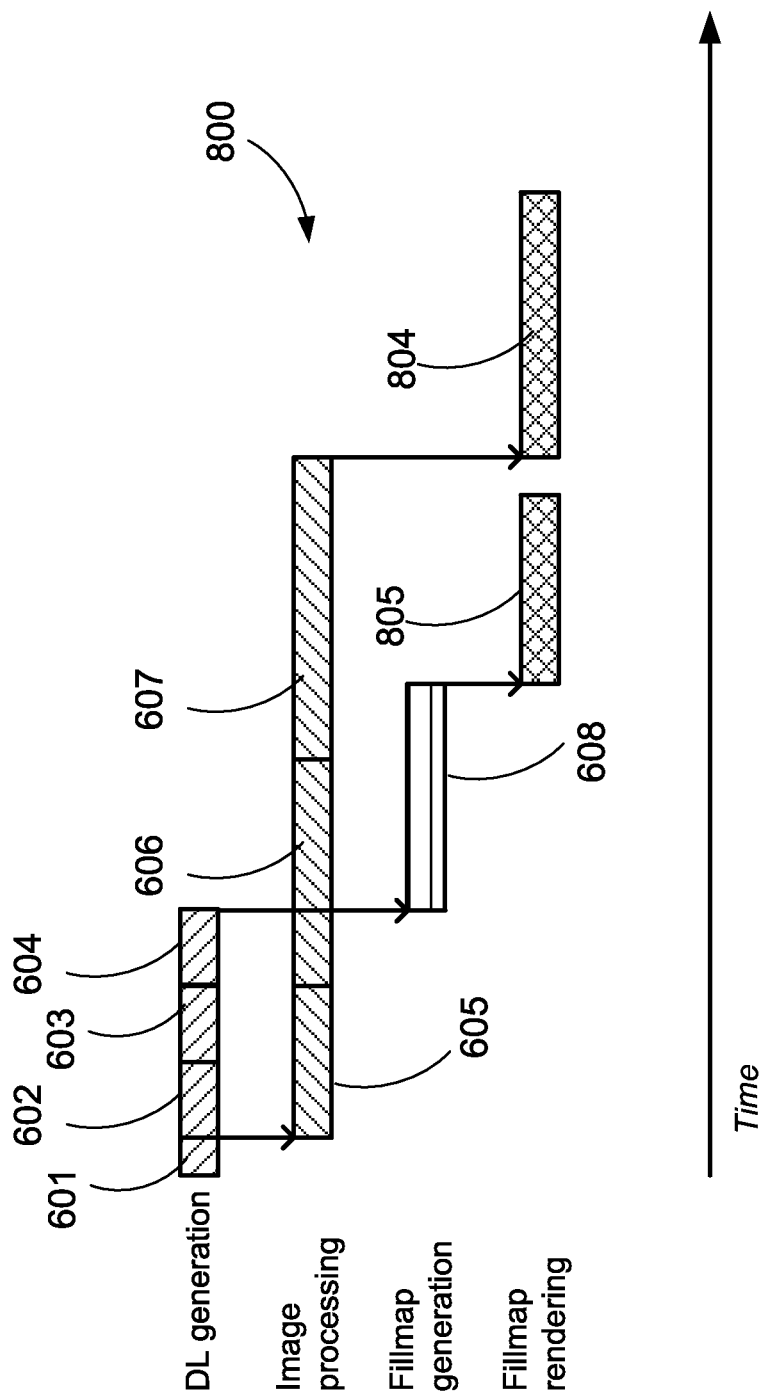
FIG. 8 shows a timeline of page rendering in another multi-threaded system.

FIG. 8 shows a processing timeline 800 for rendering the page of FIG. 6 on the system 100 where the system 100 is a multi-threaded system and the system 100 determines if a fillmap tile requires any image data in order to be rendered. In the example of FIG. 8, the system 100 may be referred to as a parallel system. As for the example of FIG. 7, all of the display list generation tasks 601, 602, 603 and 604 are performed sequentially in the example of FIG. 8 without interruption. Similarly, in the example of FIG. 8, the image processing tasks 605, 606 and 607 are also performed sequentially without interruption, substantially in parallel with the display list generation tasks 601, 602, 603 and 604. The fillmap generation task 608 is started as soon as the display list generation tasks 601, 602, 603 and 604 are complete. In the example of FIG. 8, the fillmap rendering task 609 has been split into two tasks 804 and 805. The first rendering task 805 represents the rendering of tiles that do not require image processing data or for which image processing data have been received. The second rendering task 804 represents the rendering of tiles that do require the results of image processing tasks 605, 606 and 607. As can be seen in FIG. 8, the first fillmap rendering task 805 can be started earlier than the in the examples of FIGS. 6 and 7 described above, and therefore the page can complete rendering earlier by prioritising rendering of the tiles for which no image data is required.

In a parallel system such as the system 100 of FIG. 8, the display list generation tasks 601, 602, 603 and 604 can be performed on one thread. The tasks 601, 602, 603 and 604 are responsible for adding all drawing requests (e.g. for images and for non-image objects) to a display list. For the purposes of the display list generation tasks only image metadata, such as the image dimensions, location of the image on the page, encoding and compression used, is required to add images to the display list. When the display list (DL) generation tasks 601, 602, 603 and 604 are complete, the thread can switch to the fillmap (FM) generation task 608. The fillmap (FM) generation task 608 creates the intermediate graphical representation in the form of a fillmap from the display list entries. Given that neither the display list (DL) generation tasks 601, 602, 603 and 604 nor the fillmap (FM) generation task 608 rely on image data (pixel data), the display list (DL) generation tasks and the fillmap (FM) generation task can be performed in parallel with the image processing work, which is done by one or more separate threads. Therefore, the image processing work starts before the display (DL) generation tasks 601, 602, 603 and 604 finish. Because the processing of image data is independent of the other images it is possible to assign the processing of image data to multiple threads (i.e. each image is processed by a separate thread).

An arrangement of the system 100 will be described below with reference to FIGS. 10A and 10B.

Figure 10A:
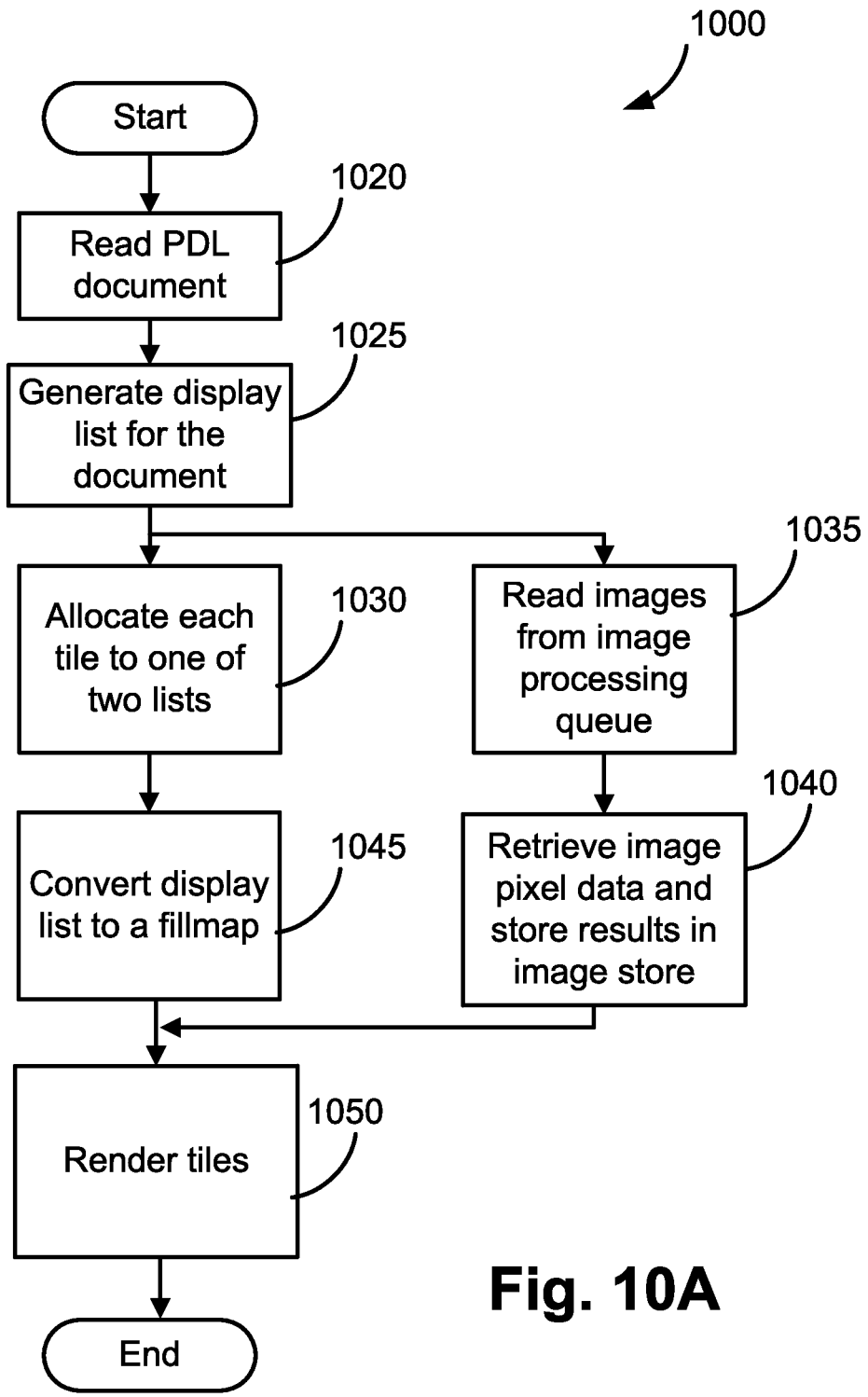
FIG. 10A is a schematic block diagram showing a method of rendering a document.

FIG. 10A is a schematic flow diagram showing a method 1000 of rendering PDL document 1001, using the system 100. The method 1000 may be implemented on the system 100 where the system 100 is a multi-threaded system (i.e., "parallel" system). The method 100 may be implemented as one or more software code modules 1002, 1003, 1005, 1007, 1011 and 1012 of the software application program 133 as seen in FIG. 10B.

A PDL document, such as the document 1001, to be printed contains various definitions and commands that describe the layout of one or more pages 1001A in the document 1001. The information is passed to display list DL generator module 1003, via a drawing interface, for generation of display lists 1004. The drawing interface provides various data structures and methods for defining the page content. One of the actions the drawing interface supports is the ability to specify the location of a PDL image on a page. The location of the PDL image on the page 1001A can be specified in various ways. One method of specifying the location of the PDL image on the page 1001A is to specify an affine transform, which defines the translation, rotation, shearing and/or scaling operations that map image space coordinates into a page coordinate system. Alternatively, the image location may be defined as a set of coordinates for a closed path in the page coordinate system. No matter how the image location is defined, the image location can be considered as a polygon in page coordinates that enclose the region where the image can be considered to have valid pixel values.

Figure 10B:
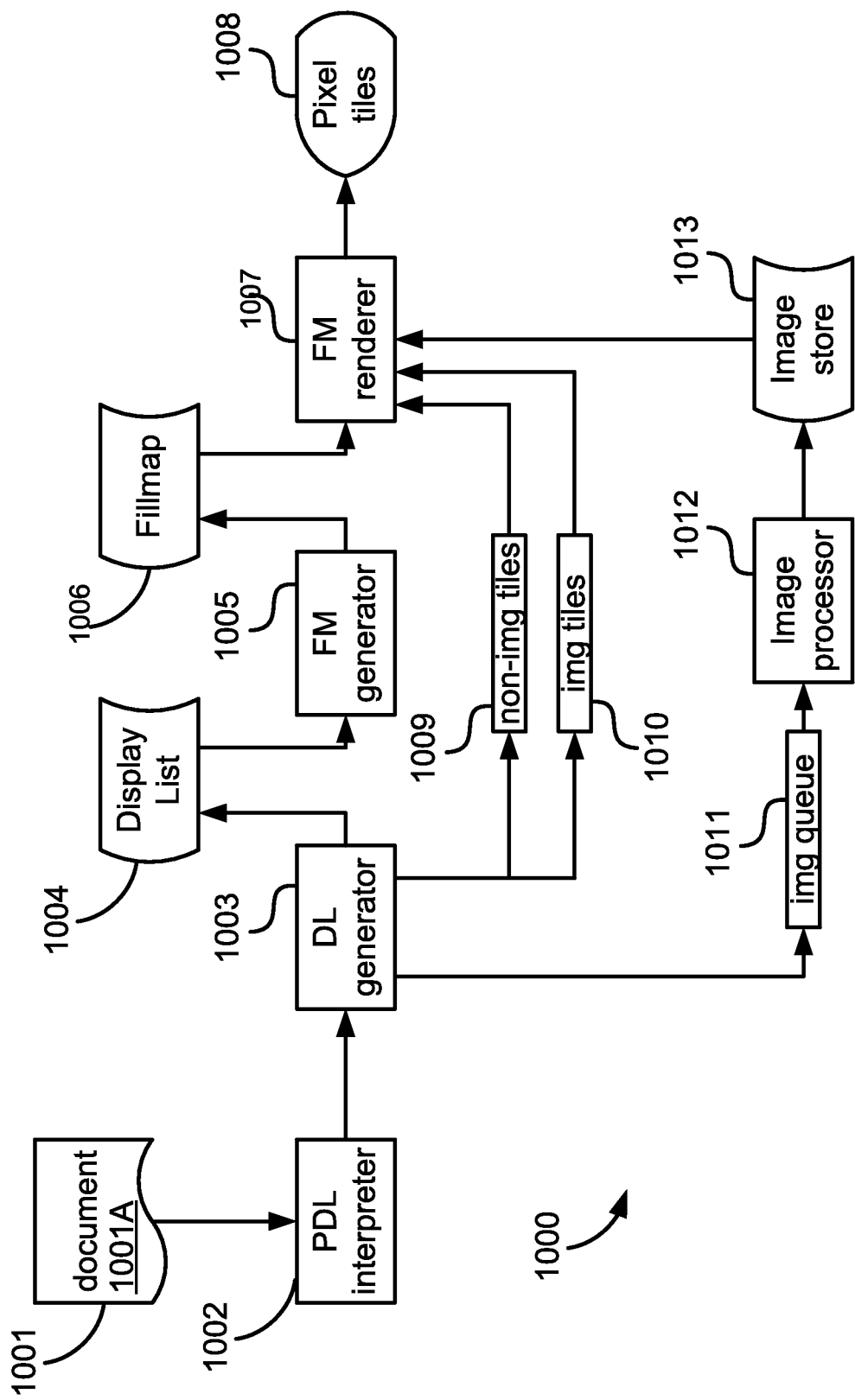
FIG. 10B shows the data flow in a multi-threaded system, in accordance with the method of FIG. 10A, using a tile-image map to schedule rendering of fillmap tiles.

When PDL interpreter module 1002 of FIG. 10B passes an image via the drawing interface to the display list (DL) generator 1003, the PDL interpreter module 1002 provides data representing various details about the image. For example, the PDL interpreter module 1002 may provide the image dimensions, location of the image on the page, encoding and compression used etc. The data representing various details about the image is saved within an entry in the display list 1004. The image pixel data is not passed to the display list (DL) generator 1003 at this time. Instead, the PDL interpreter module 1002 provides a call-back function that can be used to retrieve image pixel data when the image pixel data is required.

Before the display list (DL) generator 1003 starts processing each page (e.g., the page 1001A), the display list (DL) generator 1003 initialises a tile-image map. The tile-image map is a data structure that specifies for each fillmap tile whether any image data is required to render the tile to pixels. In one implementation, a flag of the data structure is set to FALSE for all tiles.

When the display list (DL) generator 1003 receives the drawing request for each image on the page 1001A, the display list (DL) generator 1003 uses the image location data to determine the fillmap tiles that are affected by the image. A tile is determined to be affected by an image if the image location polygon touches or includes any pixels within the tile. The tile-image map is updated to set a flag value to TRUE for each such affected tile. The process of determining the fillmap tiles that are affected by the image is repeated for each image included on the page. At the end of the page, all tiles that have their flag set to TRUE have at least one image affecting the tiles.

Figure 9:
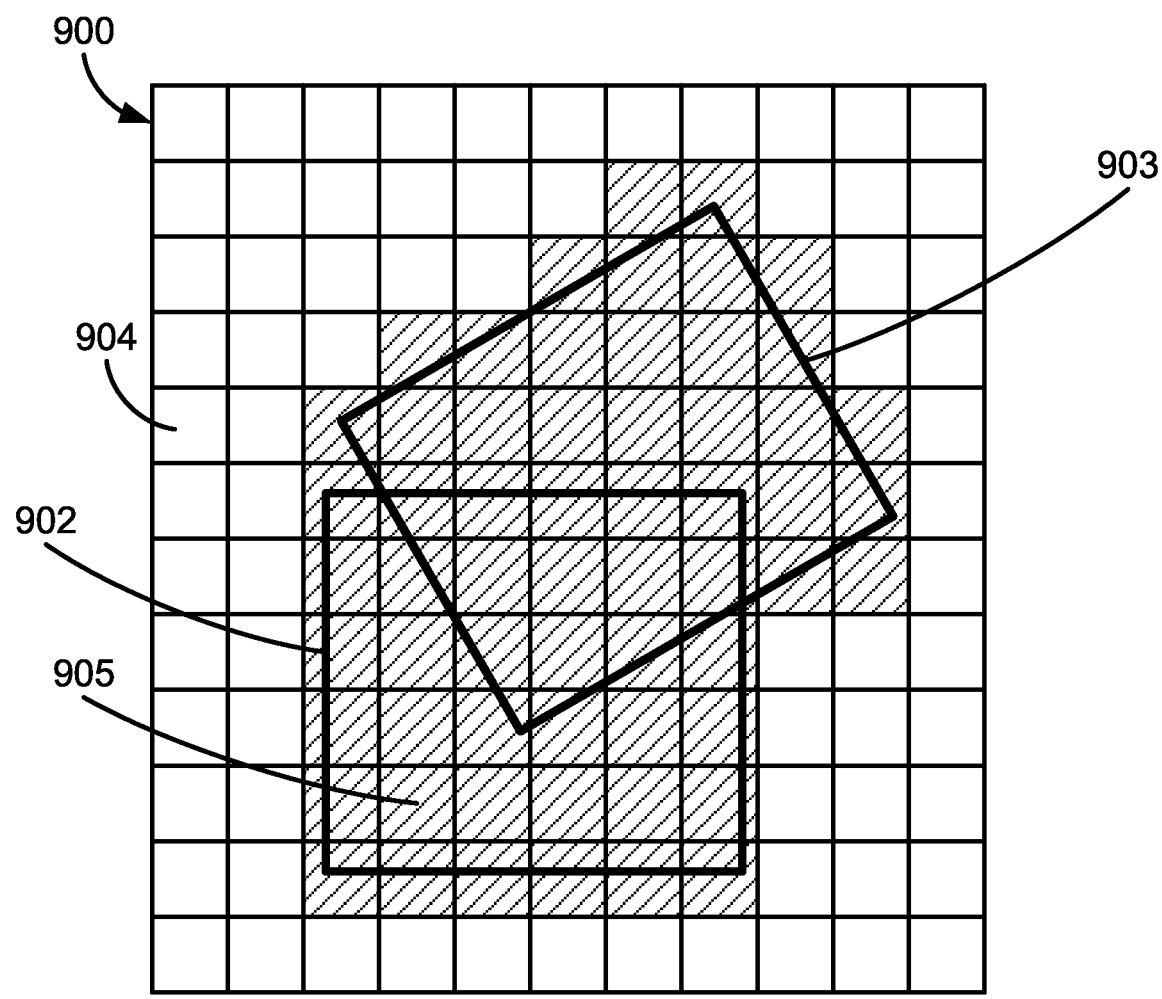
FIG. 9 is a diagram showing the state of an example tile-image map containing two unprocessed images.

FIG. 9 shows an example of a tile-image map 900 for a page that contains an upright image 902 and a rotated image 903. The tile-image map 900 is divided into square regions that represent tiles within a fillmap for the page. The shaded region represents the fillmap tiles that require image data. For example, fillmap tile 905 lies within the boundary of the image 902, and therefore fillmap tile 905 cannot be rendered until the pixel data for the image is available. On the other hand, fillmap tile 904 does not contain any image data, and therefore the fillmap tile 904 can be rendered without waiting for image data to be read and processed. Tile 904 may contain one or more non-image graphical objects, such as text objects or line art objects or the tile 904 may be empty.

As described above, the software application program 133 may be stored in the hard disk drive 110 and be controlled in its execution by the processor 105 of the printer module 101. FIG. 10B shows the data flow through the software code modules 1002, 1003, 1005, 1007, 1011 and 1012.

The method 1000 begins at reading step 1020, where the page 1001A from PDL document 1001 is read by PDL interpreter module 1002 under execution of the processor 105. The PDL interpreter module 1002 parses the page description and makes calls via the drawing interface to the display list (DL) generator module 1003.

At generating step 1025, the display list (DL) generator module 1003, under execution of the processor 105, generates display list 1004 by collecting the information from the PDL interpreter module 1002 into the display list 1004. The display list 1004 may be configured within the memory 106. Each time the display list (DL) generator module 1003 receives information about a PDL image, the display list (DL) generator module 1003 adds details of the image to an internal tile-image map configured within the memory 106. Also at step 1025, the display list (DL) generator module 1003 adds a reference to the image to an image processing queue 1011 configured within the memory 106. The image details could include, for example, the image dimensions, location of the image on the page, encoding and compression used, but not the image pixel data. The image details may be determined based on metadata associated with each of the images, with the metadata indicating the image details.

At the end of the page, the method 1000 proceeds to allocating step 1030 where the DL generator module 1003 steps through the tile-image map and allocates each tile to one of two lists. The DL generator module 10303 may be configured for determining a number of images contributing to each tile, the number of images being determined using image metadata of the images. As described below, the tiles may be allocated and/or marked for rendering based on the determined number of images contributing to each tile. If a tile requires no image data to render the tile, then the tile is allocated to non-image tile list 1009. Otherwise, if the tile requires one or more images in order to be rendered, then the tile is allocated to image tile list 1010.

Meanwhile operating in parallel to the display list (DL) generator module 1003 is the image processor module 1012. At reading step 1035, the image processor module 1012, under execution of the processor 105, reads images from the image processing queue 1011. Then at processing step 1040, the image processor module 1012 performs the required reading and processing steps to retrieve image pixel data from the PDL interpreter module 1002, and stores the results in image store 1013 configured within the memory 106.

Once the display list generation is complete, at converting step 1045, the fillmap generator module 1005, under execution of the processor 105, begins converting the display list 1004 to an intermediate graphical representation 1006 in the form of a fillmap.

When the fillmap generation is complete, at rendering step 1050, the fillmap renderer 1007, under execution of the processor 105, starts the process of rendering the tiles stored in the non-image tile list 1009 and the image tile list 1010. To render the tiles at step 1050, the fillmap generator module 1005 is configured for prioritising for rendering one or more of said tiles for which no image data is required. The fillmap generator module 1005 firstly reads tiles from the non-image tile list 1009 and renders each tile in turn, to create a final image pixel tile 1008 for each tile. The fillmap generator module 1005 may be configured for identifying each tile in response to receiving image data of one of the images contributing to the tile. The fillmap generator module 1005 may also be configured for prioritising for rendering one or more of the tiles for which all image data is received. After all of the tiles in the non-image tile list 1009 have been rendered, the fillmap renderer module 1007 waits for the image processor module 1012 to finish reading and processing all image data in the image queue 1011. When the fillmap renderer module 1007 has finished reading and processing all image data in the image queue 1011, the fillmap renderer module 1007 begins reading fillmap tiles from the fillmap 1006 and rendering each fillmap tile in turn. The fillmap renderer module 1007 creates a final image pixel tile 1008 for each tile. In order to render each fillmap tile in turn, the fillmap renderer module 1007 retrieves image pixel data for at least one image, from the image store 1013.

The tiles rendered at step 1050 may be sent to an output system as soon as the tiles have been rendered. For some output systems to which the rendered tiles may be sent, the delivery of out-of-order tiles does not affect the performance of the output system. The tiles may be rendered out-of-order as defined by the document (e.g., 1001). For example, some output systems where the delivery of out-of-order tiles does not affect the performance of the output system may include:

(i) a system where the rendered tiles are accumulated in a full-page frame buffer, and where tile content is copied to an appropriate place in the full-page frame buffer;

(ii) a system where the rendered tiles are stored in a tiled image format that supports out of order storage of tiled data, such as the TIFF image format; and (iii) a system where rendered tiles are sent over a network connection to a remote system, where the expense of re-ordering the tiles is less than the latency in transferring the data.

In other output systems, the tiles may be re-ordered back into their natural order within a page being rendered before the tiles are disposed of.

Re-ordering of the tiles will now be described. A tile reorder queue configured in memory 106, for example, accepts tiles in random order, and provides the tiles to a downstream component in a natural page order, where tiles are provided in an X-Y sequence. The tile reorder queue comprises:

(i) an ordered list of tiles that have been rendered but not yet passed to the output system, where the list is initialised to empty; and (ii) a counter of the last tile sent to the output system, where the counter is initialised to zero.

As each tile is rendered at step 1050, the tile is added to the ordered tile list in the reorder queue in the appropriate place given a page sequence number for the tile. Tiles continue to be added to the ordered tile list until the head of the tile list contains a set of one or more sequential tiles, with the first tile having the sequence number one greater than the last tile counter. If the head of the tile list contains a set of one or more sequential tiles, with the first tile having the sequence number one greater than the last tile counter, then the matching set of tiles are removed from the list, the tiles are sent to the output system, and the last tile counter is updated to reflect the highest tile sequence number in the set. The process of adding tiles to the ordered tile list until the head of the tile list contains a set of one or more sequential tiles, repeats until the last tile is rendered, in which case the remaining tiles can be sent to the output system.

The temporary storage of rendered tiles in the tile reorder queue requires a portion of the memory 106 to be allocated and not freed until tiles can be flushed to the output system. In some cases, the usage of the memory 106 is larger than desired. A number of methods can be employed to keep memory usage below a given level. For example, one of the methods involves not letting the out-of-order rendering to get too far ahead of an oldest "in-progress" tile. Tile rendering may be restricted to proceed no more than a specified number of tiles ahead of the last tile counter. Further, image reading may be prioritised to favour unprocessed images that are closer to the top of the page.

An alternate arrangement of the system 100 will be described below with reference to FIGS. 13A and 13B.

Figure 13A:
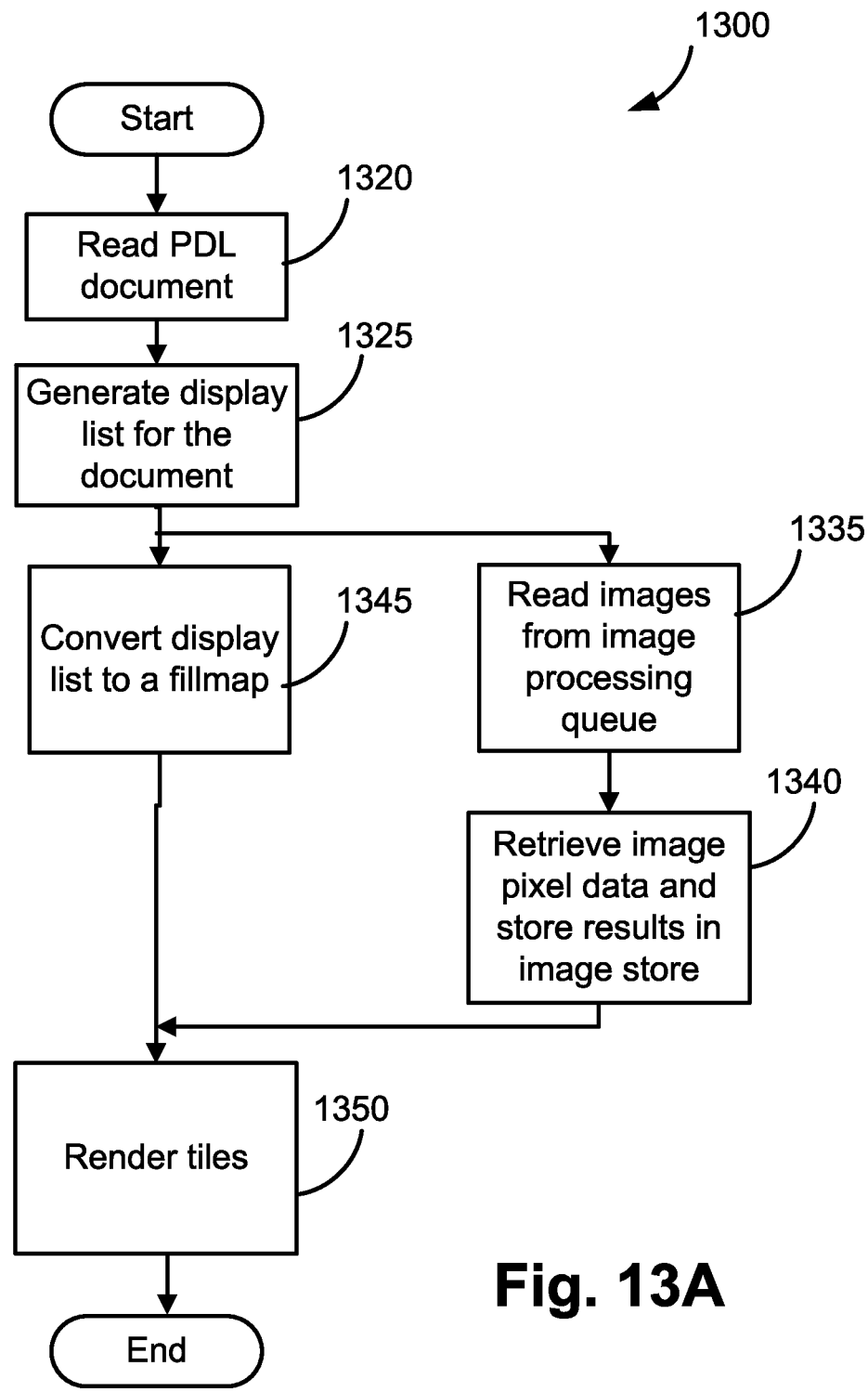
FIG. 13A is a schematic block diagram showing a method of rendering a document.

FIG. 13A is a schematic flow diagram showing a method 1300 of rendering the PDL document 1001. The method 1300 may be implemented on the system 100 where the system 100 is a multi-threaded system (i.e., "parallel" system). The method 100 may be implemented as one or more of the software code modules 1002, 1003, 1005, 1007, 1011 and 1012 of the software application program 133 as seen in FIG. 13B.

Figure 13B:
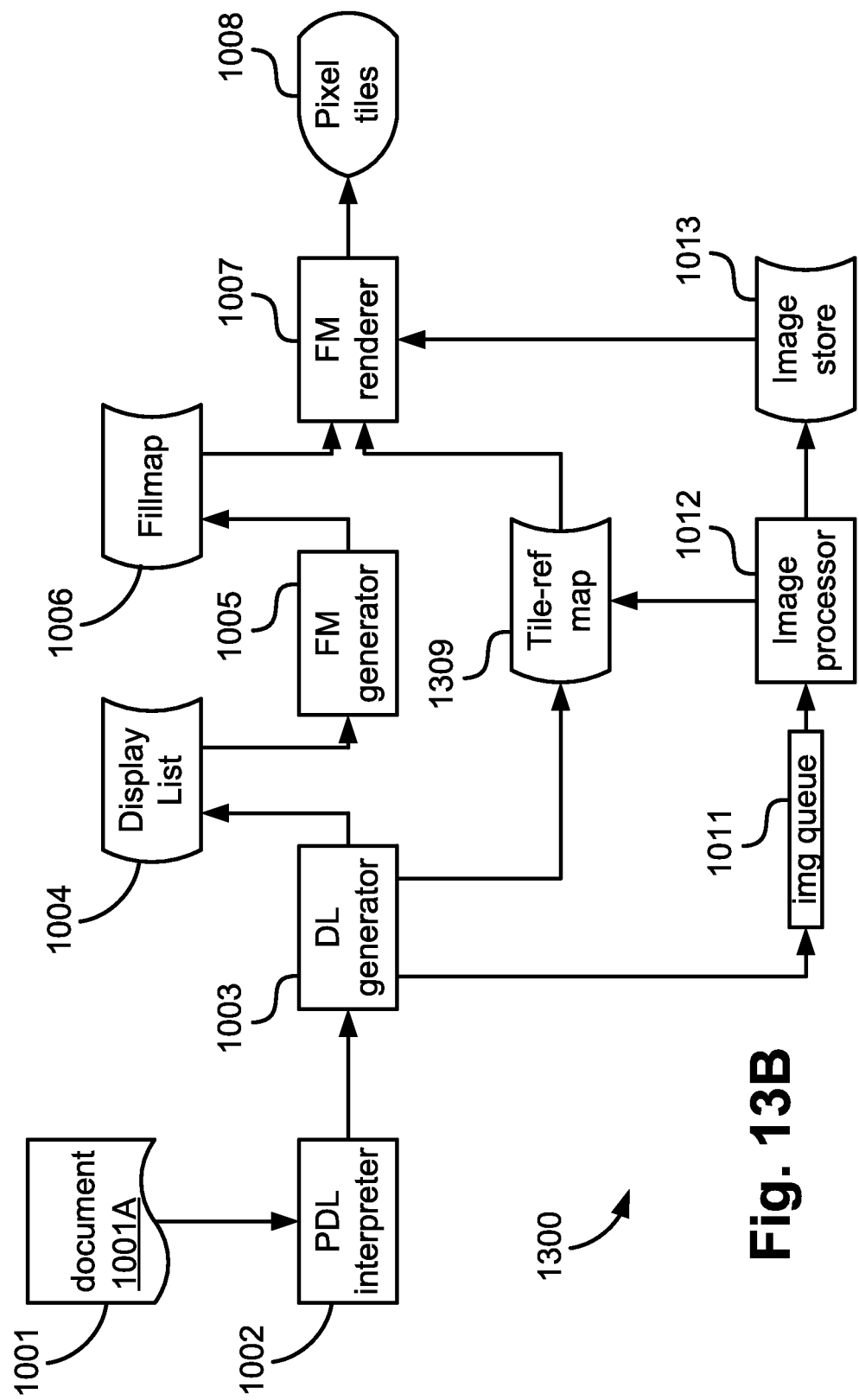
FIG. 13B shows the data flow in a multi-threaded system, in accordance with the method of FIG. 13B, using a tile-ref map to schedule rendering of fillmap tiles.

In accordance with the arrangement of FIGS. 13A and 13B, performance of the system 100 may be increased by making fillmap tiles available for rendering as soon as all prerequisite image data has been received, rather than waiting for the image reading and processing step to be completed for all tiles. The main difference in the arrangement of FIGS. 13A and 13B, compared to the other arrangements described above, is that the tile-image map, the non-image tile queue and the image tile queue are replaced with a new data structure referred to as a tile-ref ("tile reference") map 1309.

In the arrangement of FIGS. 13A and 13B, the system 100 is used for determining a number of images contributing to at least one of the tiles of a fillmap, the number of images being determined using image metadata of the images. The system 100 is then configured for marking a tile for rendering based on the determined number of images contributing to the tile and rendering a document (e.g., document 1001) using the marked tile. In the example of FIGS. 13A and 13B, Before display list (DL) generator 1003 starts processing each page (e.g., page 1001A), display list generator 1003 initialises the tile-ref ("tile reference") map 1309. The tile-ref map 1309 is similar to the tile-image map defined above, except that for each tile in the tile-ref map 1309, the tile-ref map 1309 contains a count of the number of images whose content is required to render the tile to pixels.

When the display list (DL) generator 1003 receives the drawing request for each image on the page 1001A, the display list (DL) generator 1003 uses the image location data to determine fillmap tiles that are affected by the image. A tile is determined to be contributed to by an image if the image location polygon touches or includes any pixels within the tile. The reference count in the tile-ref map 1309 is incremented for each such contributing tile. The process of incrementing the reference count in the tile-ref map 1309 for each affected tile is repeated for each image included on the page 1001A. A marked tile may be rendered in parallel with receiving a further image touching at least one further unmarked tile of the tile-ref map 1309.

Figure 11:
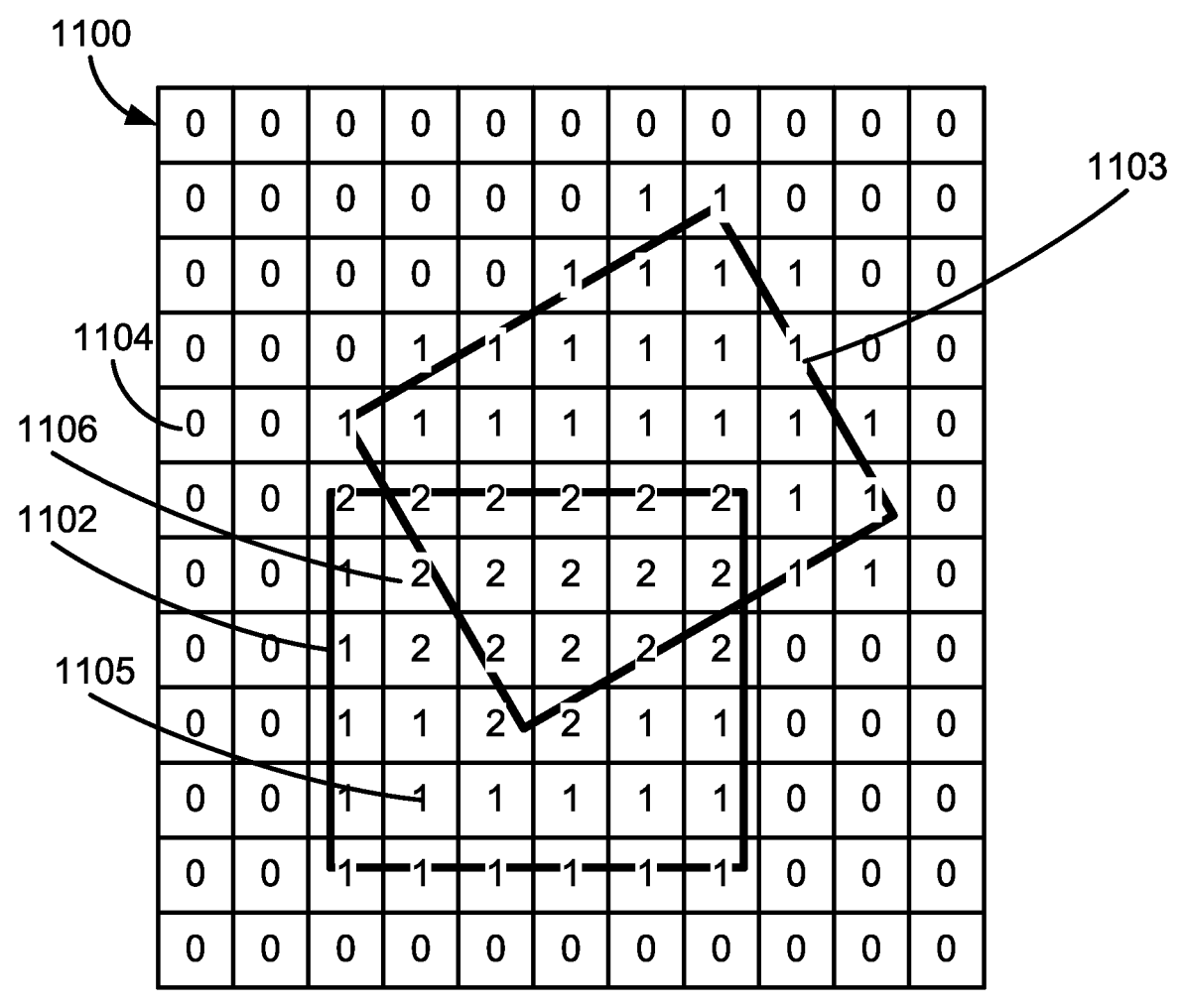

FIG. 11A shows an example of a tile-ref map 1100 for a page that contains an upright image 1102 and a rotated image 1103. The tile-ref map 1100 is divided into square regions that represent the tiles within the fillmap of the page. For example, fillmap tile 1105 lies within the boundary of one image 1102, and therefore fillmap tile 1105 cannot be rendered until the data for one image 1102 is available. Fillmap tile 1106 is affected by two images, 1102 and 1103, so that fillmap tile 1106 has a reference count of two (2). On the other hand, fillmap tile 1104 does not contain any image data, and therefore fillmap tile 1106 can be rendered without waiting for image data to be read and processed. Fillmap tile 1106 has a reference count of zero (0). Note that the tile-ref map 1100 supports updates as images are read and therefore become available for rendering. A tile may be marked as ready for rendering when the number of received images touching the tile is not less than the number of the images contributing to the tile. As each image is read and processed, the reference counts in the associated tiles in the tile-ref map 1100 are decremented by one. The determination of associated tiles is performed in the same way as was done when the image was first received, using the image location information. Therefore, the reference count represents the unprocessed images that affect each tile.

Figure 12:
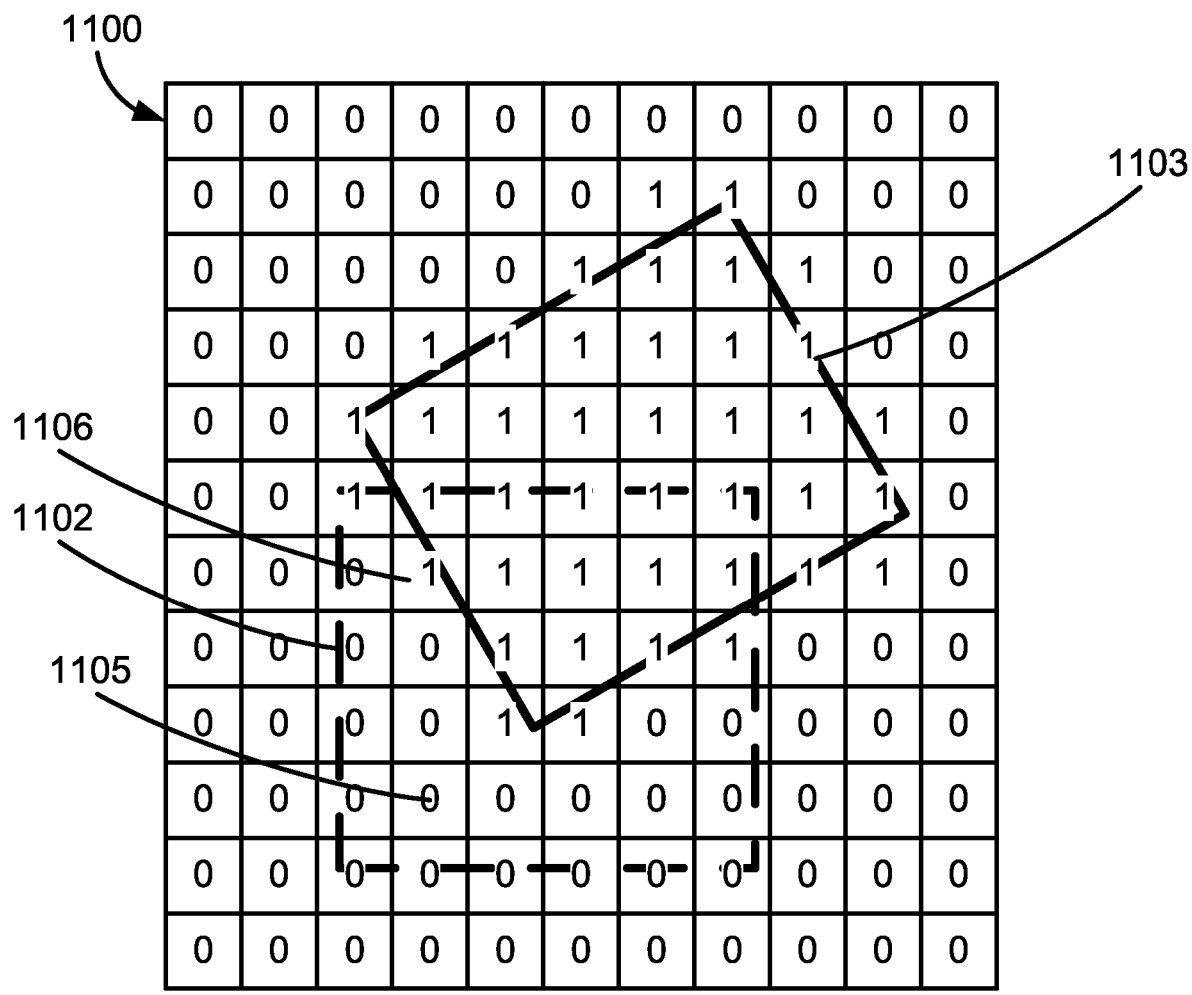
FIG. 12 is a diagram showing the state of a tile-ref map containing one unprocessed image and one processed image.

FIG. 12 shows the state of the tile-ref map 1100 after image 1102 has been received and processed. All the tiles that were affected by the image 1102 have had their reference counts decremented by one (1). For example, fillmap tile 1105 lies within the boundary of image 1102, and therefore the reference count of the fillmap tile 1105 has been decremented from one (1) to zero (0). The fillmap tile 1105 is now eligible for rendering as all image data for the tile 1105 has been received. Fillmap tile 1106 originally had a count of two (2). The count for fillmap tile 1106 has been reduced to one (1) so that fillmap tile 1106 cannot be rendered until the remaining image 1103 has been received and processed. For the purposes of the present disclosure image data processing includes image decoding, compression/decompression, geometrical transformation (rotation, scaling, and translation), colour space conversion, dividing into tiles, half-toning etc.

The method 1300 begins at reading step 1320, where the page 1001A from PDL document 1001 is read by the PDL interpreter module 1002 under execution of the processor 105. The PDL interpreter module 1002 parses the page description and makes calls via the drawing interface to the display list (DL) generator module 1003.

At generating step 1325, the display list (DL) generator module 1003, under execution of the processor 105, generates display list 1004 by collecting the information from PDL interpreter module 1002 into the display list 1004. As described above, the display list 1004 may be configured within the memory 106. In the arrangement of FIGS. 13A and 13B, each time the display list (DL) generator module 1003 receives information about a PDL image, the display list (DL) generator module 1003 adds the image details to the tile-ref map 1309. Also at step 1325, the display list (DL) generator module 1003 adds a reference to the image to the image processing queue 1011 configured within the memory 106. As described above, the image details could include, for example, the image dimensions, location of the image on the page, encoding and compression used, but not the image pixel data.

Meanwhile operating in parallel to the display list (DL) generator module 1003 is the image processor module 1012. At reading step 1335, the image processor module 1012, under execution of the processor 105, reads images from the image processing queue 1011. Then at processing step 1340, the image processor module 1012 performs the required reading and processing steps to retrieve image pixel data from the PDL interpreter module 1002, and stores the results in the image store 1012 configured within the memory 106. As each image is added to the image store 1013 the corresponding tiles in the tile-ref map 1309 have their reference count decremented by one (1). The determination of the corresponding tiles is performed as the incrementing was performed as described above, using the image location data.

Once the display list generation is complete, at converting step 1345, the fillmap generator module 1005, under execution of the processor 105, begins converting the display list 1004 to an intermediate graphical representation 1006 in the form of a fillmap.

When the fillmap generation is complete, at rendering step 1350, the fillmap renderer 1007, under execution of the processor 105, starts the process of rendering the tiles stored in the tile-ref map 1309. To render the tiles at step 1350, the fillmap generator module 1005 reads available tiles from the tile-ref map 1309 and renders each tile in turn, to create a final image pixel tile 1008. In the arrangement of FIGS. 13A and 13B, a tile is determined to be available if the corresponding reference count for the tile is at or below a pre-determined threshold. The pre-determined threshold may be zero. However, if the system 100 is configured to predict if one or more images will shortly be received, then the pre-determined threshold may be a value greater than zero. The prediction is used to determine if the time remaining before the image data for the tile is read and processed by the image processor 1012 is less than the time before the fillmap renderer module 1007 will start rendering the fillmap tile. The determination of the time remaining before the image data for the tile is read and processed and the time before the fillmap renderer module 1007 will start rendering the fillmap tile, may be estimated by looking at the position of the image[s] in the image queue 1011 and also the position of the tile in the sequence to be rendered by the fillmap renderer module 1007. If there are no available tiles in the tile-ref map 1309, then the fillmap renderer module 1007 must wait until some tiles have become available.

As described above, the tiles rendered at step 1350 may be sent to an output system as soon as the tiles have been rendered.

The use of the tile-ref map 1309 as described above can allow more fillmap tiles to be rendered sooner. In the arrangements described above, images are read and received from the PDL interpreter module 1002 in the order that the images are received by the display list (DL) generator module 1003. In another arrangement, the reading and processing of images may be re-ordered to improve the throughput of the system 100.

Figure 14:
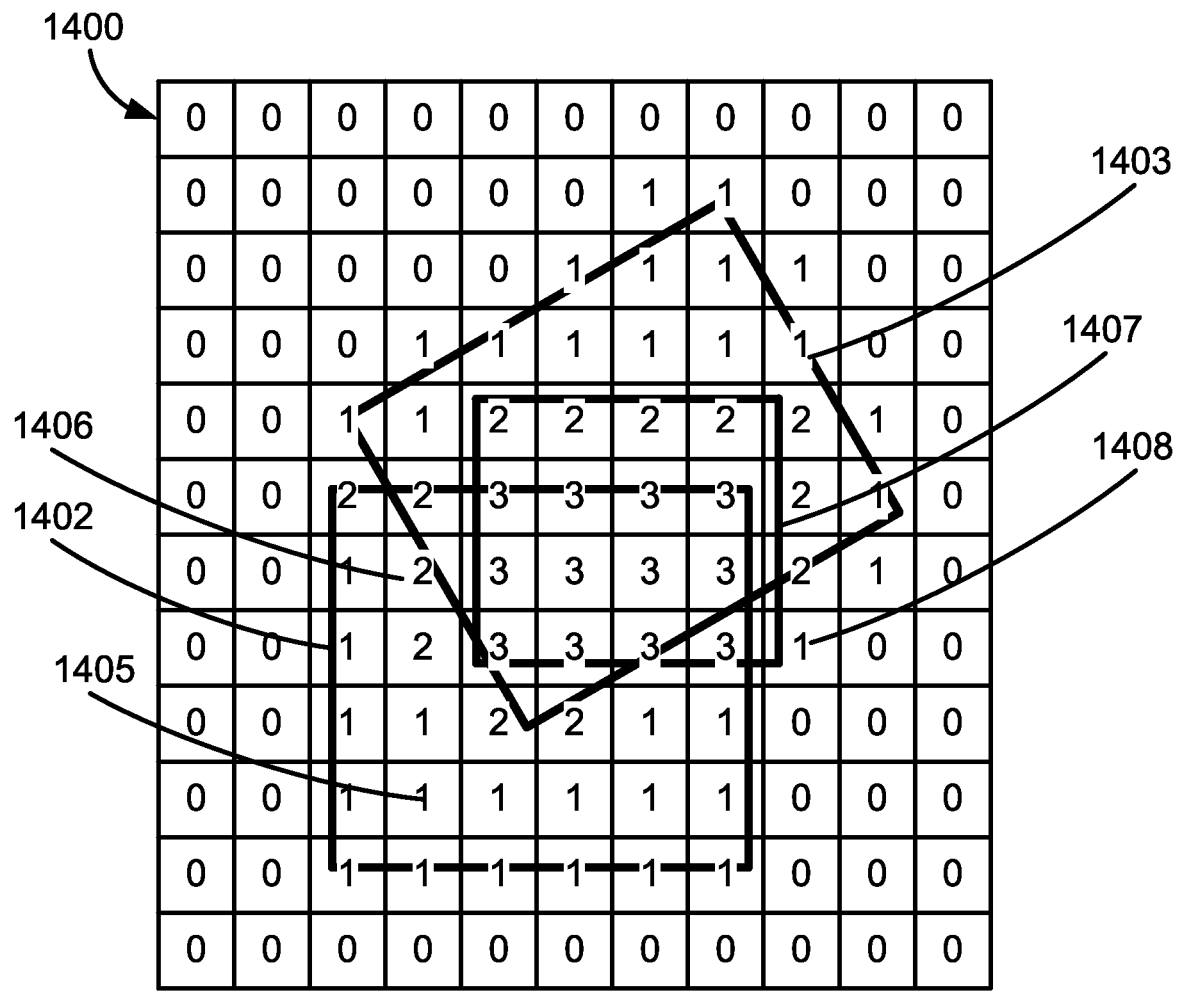
FIG. 14 is a diagram showing the state of a tile-ref map containing three unprocessed images.

FIG. 14 shows a tile-ref map 1400 that contains three images 1402, 1403 and 1407. None of the images 1402, 1403 and 1407 have been requested from the PDL interpreter module 1002, so that the reference counts for the tiles contain the maximal value of required images. For example, where the fillmap renderer module 1007 is waiting for fillmap tiles to become available for rendering because all the zero-reference tiles have been rendered already, the choice of the next image to read and process can affect throughput of the system 100. If the next image selected to be read and processed is image 1407, then only one tile 1408 is freed up for rendering. On the other hand, if the next image selected to be read and processed is image 1402, then a total of eighteen (18) fillmap tiles (e.g., tile 1405) will become available for rendering.

Therefore, an improvement to the performance of the system 100 can be gained by the image processing task if the system 100 is configured to schedule image reading and processing based on the maximum gain that will be obtained based on the choice of the next image to read. In one arrangement, the image that has the most number of tiles of value "1" in the tile-ref map may be selected as the next image to read (i.e., a maximum number of tiles would become available for rendering once the selected image is processed). Reading the selected image first ensures that the greatest number of tiles will become available to the fillmap renderer module 1007 once the image has been received and processed. Alternatively, the next image to read may be selected on the basis of which image can be read and processed in the least time, and which image will result in at least a minimum number of tiles becoming available for rendering.

In the split system 200 there is an additional source of latency in the form of the time that it takes to transfer large amounts of image data from the printer host module 201 to the printer module 101 via the network 120. The latency may be reduced by using the methods described above. In one arrangement, when the fillmap (i.e., the intermediate graphical representation) is transferred from the printer host module 201 to the printer module 101, the fillmap is converted to a serialised fillmap format as described in detail below. The serialised fillmap is transmitted via the network 120 from the host module 201 to the printer module 101. A modified version of a standard serialised fillmap format is used in the described methods. In particular, the standard serialised fillmap format is modified as follows:

(i) information about fillmap tiles that need image data is included in the serialised fillmap, where the fillmap tile information may be either a tile-image map (e.g., 900) or a tile-ref map (e.g., 1309), as described above; and (ii) image pixel data is sent to the printer module 101 last.

During receipt of the serialised fillmap data on the printer module 101, a point is reached where only the image pixel data has not been received. At the point where only the image pixel data has not been received, the printer module 101 can begin rendering tiles that do not require image pixel data, by consulting the deserialised tile-image-map or the tile-ref map for the image. Consultation of the deserialised tile-image map or tile-ref map can be done in parallel with receiving the image data. The parallel consultation of the tile-image and tile-ref maps and receipt of the image data allows some of the tile rendering to start before all of the serialised fillmap data has been received by the printer module 101.

Figure 15:
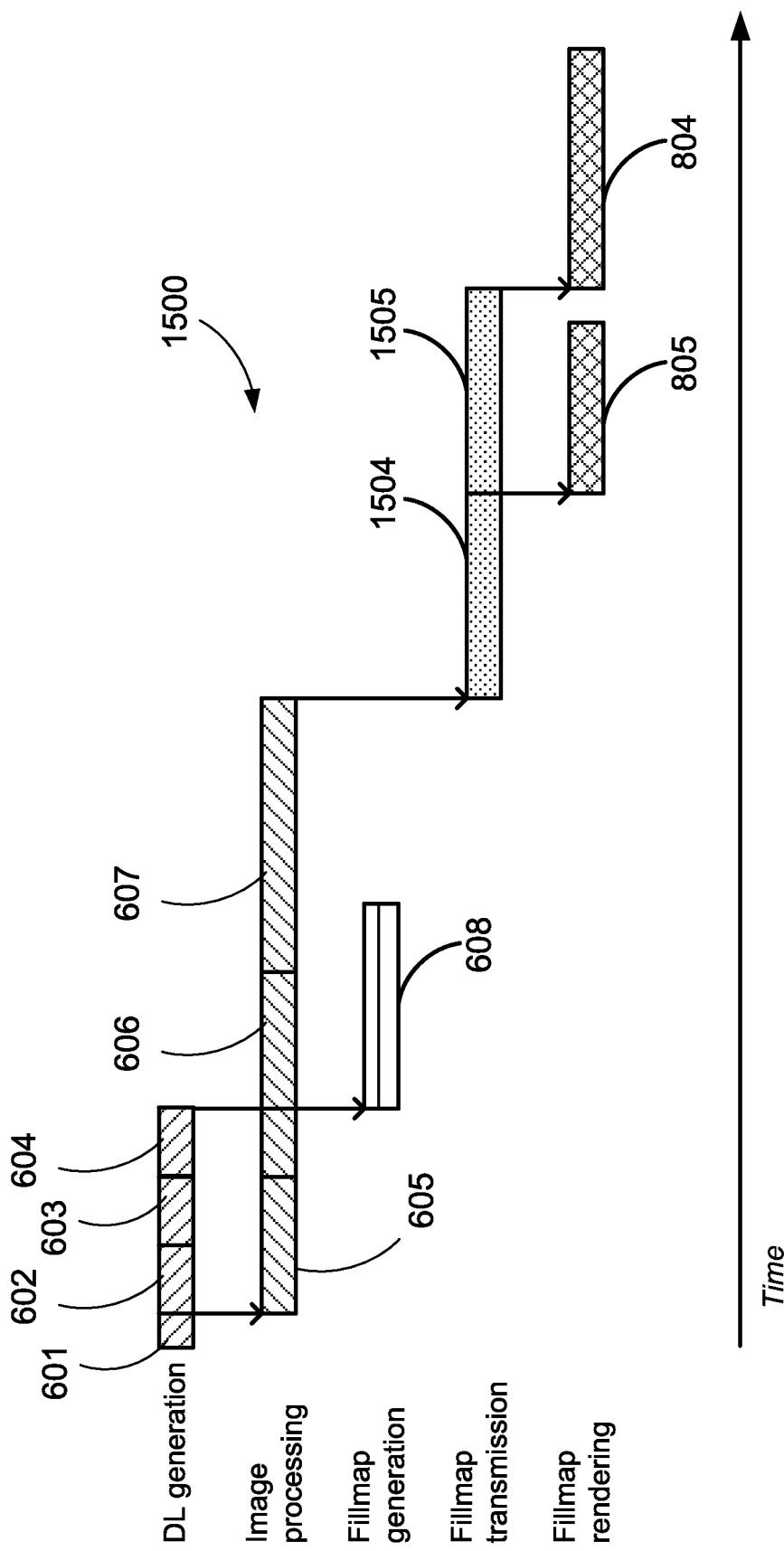
FIG. 15 shows a timeline of page rendering in an improved split printing system.

FIG. 15 shows a timeline 1500 for rendering the page 401A of FIG. 6 using the modified serialised fillmap format described above in the system 200. In the arrangement of FIG. 15, the display list generation tasks 601, 602, 603 and 604, the image data receiving and processing tasks 605, 606 and 607 and the fillmap generation task 608 occur as described above in the arrangements of FIG. 7 and FIG. 8. Once all of the tasks 601, 602, 603, 604, 605, 606, 607 and 608 have completed, the fillmap data structure is serialised and transmitted from the host module 201 to the printer module 101.

The fillmap transmission is broken into two tasks (or "phases"), the transmission of non-image data during task 1504 followed by the transmission of the image pixel data during task 1505. When all of the non-image data has been received by the printer module 201 following task 1504, the printer module 201 is able to start rendering tiles that do not require image data as at the first rendering task 805 described above. When the image pixel data has been received following task 1505, the printer module 101 can then render the remaining image tiles as at the second rendering task 804 described above. The rendering of non-image tiles during task 805 is performed while image data is still being received by the printer module 101 during task 1505, leading to improved performance in the system 200.

In the arrangement of FIG. 15, the image data is received from the PDL interpreter module 406 and stored in the image store 1013. The image data may be stored in separate portions, such as tiles or strips. A further refinement to the parallel receipt of image data and rendering of fillmap tiles as described above is possible. A tile-ref map may be used to link image data with affected fillmap tiles as described above. However, instead of incrementing a counter for each image that affects a fillmap tile, the counter is incremented for each image portion (e.g. tile or strip). The determination of affected fillmap tiles may be performed as described above, except that the determination of the affected files is performed for each image portion, using the location of the portion of the image on the page 401A being rendered. Instead of decrementing the counter once the whole image has been received, appropriate reference counters may be decremented as a corresponding image portion is received. Using the arrangement of FIG. 15, rendering of some tiles can start when the required image portions have been received by the printer module 101, and while remaining data for an image is still being transferred from the host module 201 to the printer module 101.

INDUSTRIAL APPLICABILITY

The arrangements described are applicable to the computer and data processing industries and particularly for image rendering.

The foregoing describes only some embodiments of the present invention, and modifications and/or changes can be made thereto without departing from the scope and spirit of the invention, the embodiments being illustrative and not restrictive.

The invention claimed is:

1. A method of rendering a document described in a page description language, the method comprising:
    receiving page description data representing the document comprising a plurality of images, the page description data including image metadata for the plurality of images;
    forming an intermediate graphical representation of the document based on the image metadata, the intermediate graphical representation being subdivided into a plurality of tiles, each tile being associated with a counter indicating a number of images contributing to said tile determined based on the image meta data;
    in response to receiving image pixel data of one of the plurality of images subsequent to the intermediate graphical representation being formed, marking a tile of the intermediate graphical representation by comparing a determined number of images for the tile for which image pixel data is received with the number of images contributing to said tile as indicated by the counter; and
    rendering the marked tile.

2. The method according to claim 1, wherein the marked tile is rendered in parallel with receiving a further image touching at least one further unmarked tile of the intermediate graphical representation.

3. The method according to claim 1, further comprising rendering one or more of the tiles for which no image pixel data is required prior to rendering tiles for which image pixel data is required.

4. The method according to claim 1, further comprising prioritising for rendering one or more of said tiles for which all image pixel data is received.

5. The method according to claim 1, wherein the amount of the received image pixel data for the tile is not less than the amount of image pixel data contributing to said identified tile.

6. The method according to claim 1, wherein said tiles are rendered out-of-order as defined by the document.

7. The method according to claim 1, further comprising:
    forming a display list representation, in parallel with receiving image pixel data for at least one of said images; and
    forming the intermediate graphical representation using the display list.

8. The method according to claim 1, wherein the number of images contributing to said tile is determined using image metadata associated with said images, the image metadata comprising a description of an image location on a page of the document.

9. The method according to claim 1, further comprising incrementing the number of images indicated by the counter corresponding to said identified tile if image metadata for an image touching said identified tile is received.

10. The method according to claim 1, further comprising, in response to receiving image pixel data for an image contributing to said tile, incrementing the determined number associated with said tile.

11. The method according to claim 1, further comprising selecting further image pixel data to be read based on a further plurality of counters associated with said tiles, the further plurality of counters representing the number of images contributing to said tiles for which image pixel data is yet to be received.

12. The method according to claim 1, wherein said tile is marked based on the determined number reaching the number of images contributing to said tile.

13. The method according to claim 1, wherein said tile is determined using image metadata associated with at least one of said images contributing to said identified tile.

14. The method according to claim 1, further comprising rearranging rendered tiles in accordance with positions of the tiles on pages of the document.

15. A system for rendering a document described in a page description language, the system comprising:
    a memory for storing data and a computer program;
    a processor coupled to the memory for executing said program, said program comprising instructions for:
        receiving page description data representing the document comprising a plurality of images, the page description data including image metadata for the plurality of images;
        forming an intermediate graphical representation of the document based on the image metadata, the intermediate graphical representation being subdivided into a plurality of tiles, each tile being associated with a counter indicating a number of images contributing to said tile determined based on the image metadata;
        in response to receiving image pixel data of one of the plurality of images subsequent to the intermediate graphical representation being formed, marking a tile of the intermediate graphical representation by comparing a determined number of images for which image pixel data is received with the number of images contributing to said tile as indicated by the counter; and
        rendering the marked tile.

16. An apparatus for rendering a document described in a page description language, the method comprising:

a memory for storing data and a computer program;

a processor coupled to the memory for executing said program, said program comprising instructions for:

receiving page description data representing the document comprising a plurality of images, the page description data including image metadata for the plurality of images;

forming an intermediate graphical representation of the document based on image metadata for the plurality of images, the intermediate graphical representation being subdivided into a plurality of tiles, each tile being associated with a counter indicating a number of images contributing to said tile determined based on the image metadata;

in response to receiving image pixel data of one of the plurality of images subsequent to the intermediate graphical representation being formed, marking a tile of the intermediate graphical representation by comparing a determined number of images for the tile for which image pixel data is received with the number of images contributing to said tile as indicated by the counter; and rendering the marked tile.

17. A non-transitory computer readable medium having a computer program stored thereon for rendering a document described in a page description language, the computer program comprising:

code for receiving page description data representing the document comprising a plurality of images, the page description data including metadata for the plurality of images;

code for forming an intermediate graphical representation of the document based on the image metadata, the intermediate graphical representation being subdivided into a plurality of tiles, each tile being associated with a counter indicating a number of images contributing to said tile determined based on the image metadata;

code for, in response to receiving image pixel data of one of the plurality of images subsequent to the intermediate graphical representation being formed, marking a tile of the intermediate graphical representation by comparing a determined number of images for the tile for which image pixel data is received with the number of images contributing to said tile as indicated by the counter; and code for rendering the marked tile.

* * * * *